United States Patent [19]
Donovan et al.

[11] Patent Number: 5,364,060
[45] Date of Patent: Nov. 15, 1994

[54] ADJUSTABLE MECHANIZED SEAT SUSPENSION

[75] Inventors: Kyle P. Donovan, Milwaukee; Bradley S. Boyles, Mequon, both of Wis.

[73] Assignee: Milsco Manufacturing Company, Milwaukee, Wis.

[21] Appl. No.: 33,820

[22] Filed: Mar. 19, 1993

[51] Int. Cl.$^5$ ............................................. F16M 13/00
[52] U.S. Cl. ................................... 248/588; 248/584; 248/421; 248/423; 267/131
[58] Field of Search ............... 248/421, 573, 580, 584, 248/588, 594, 601, 619, 423; 267/131, 73

[56] References Cited

U.S. PATENT DOCUMENTS

| | | |
|---|---|---|
| 3,339,906 | 9/1967 | Persson . |
| 3,473,776 | 10/1969 | Costin ............................ 248/421 X |
| 3,599,232 | 8/1971 | Tabor . |
| 4,029,283 | 6/1977 | Swenson et al. . |
| 4,029,284 | 6/1977 | Swenson ........................ 248/421 X |
| 4,034,948 | 7/1977 | Brownell ........................ 248/423 X |
| 4,125,242 | 11/1978 | Meiller et al. . |
| 4,183,492 | 1/1980 | Meiller . |
| 4,344,597 | 8/1982 | Eimen . |
| 4,382,573 | 5/1983 | Aondetto . |
| 4,880,201 | 11/1989 | Hall et al. ....................... 248/421 X |
| 4,890,810 | 1/1990 | Sakamoto ........................... 248/588 |
| 5,125,631 | 6/1992 | Brodersen et al. . |
| 5,222,709 | 6/1993 | Culley, Jr. et al. ............. 248/588 X |

FOREIGN PATENT DOCUMENTS 2915259 10/1980 Germany ............................ 248/421

Primary Examiner—Alvin C. Chin-Shue
Assistant Examiner—Derek J. Berger
Attorney, Agent, or Firm—Nilles & Nilles

[57] ABSTRACT

A seat suspension system for supporting a seat support member on a base member includes support arms which cooperate with a spring suspension so as to suspend loads imposed on the seat. The support arms are connected to one of the seat support member and base member by a support mechanism. A cam element acts upon at least one of the seat support member and the base member and presents a cam surface offering a resistance to the motion of the accompanying cam follower which varies depending upon the height of the seat support member. The system preferably includes a height adjust mechanism for adjusting the unloaded distance between the seat support member and the base member. The height adjust mechanism may be either a ratchet mechanism which is operated by lifting the seat support member, or a spring assisted mechanism which is operable independently of the main suspension springs and which automatically biases an unloaded seat support member upwardly.

30 Claims, 20 Drawing Sheets

ADJUSTABLE MECHANIZED SEAT SUSPENSION

BACKGROUND OF THE INVENTION

1. Field of the Invention

The invention relates to suspensions for vehicle seats and the like and, more particularly, relates to mechanized suspensions for supporting seats the unloaded height of which can preferably be adjusted.

2. Discussion of the Related Art

Vehicle seat suspensions are well known and typically include a base member which is fixed at least from vertical movement and a seat support member which is mounted on the base member so as to be vertically moveable with respect to the base member when a load is imposed on the seat. Such members often include devices for adjusting the unloaded distance between the base member and the seat support member. One such mechanism is disclosed in U.S. Pat. No. 4,125,242 to Meiller et al. The mechanism disclosed by Meiller et al. includes laterally opposed scissor arm mechanisms connecting the base and seat support members and biased by tension springs so as to urge the seat support member away from the base member. The scissor arm mechanisms deflect (against the force of the tension springs) when a load is imposed on the seat support member. This relative motion is permitted by relative motion between a cam connected to the scissor arm mechanisms and a cam follower connected to the tension springs, respectively. The unloaded height of the seat support member can be adjusted by operation of a ratchet mechanism connecting the scissor arm mechanisms to the cam.

The mechanism disclosed by Meiller et al. suffers from several drawbacks. For instance, the cam and associated support mechanisms are integral with the scissor arm mechanism. As a result, the entire weight of the seat support plate assembly and all articles supported thereon are supported by the scissor arm mechanisms. The resulting relatively high forces imposed on the suspension joints tend to increase the friction in the suspension.

Moreover, the arrangement of the cam, the cam follower, the extension springs, and the tension adjusters is such that, during operation of the suspension system, the handle for adjusting the tension in the extension springs moves in and out with respect to the suspension housing. The handle also has the potential to interfere with and cause discomfort to the legs of the operator.

The design of Meiller et al. also does not permit easy interchangeability of ratchet and spring assist height adjust mechanisms. Such a task would instead require a significant rearrangement of components. Moreover, because the cam and ratchet height adjust mechanism are integral with the scissor arm mechanism, these mechanisms cannot be independently serviced.

Another seat suspension system, disclosed by Brodersen et al. in U.S. Pat. No. 5,125,631, supports most of the weight of the seat support member by a central arm assembly, and incorporates scissor arm mechanisms only to provide lateral stability to the seat. Separate embodiments of this mechanism provide for height adjustment of the seat support member either through operation of a ratchet mechanism, which can be operated by lifting the seat support member, or through operation of a spring-assisted mechanism, which automatically raises an unloaded seat member upon actuation of a handle.

The cam operated suspension system of Brodersen et al. suffers from several drawbacks and disadvantages. For instance, the cam surfaces rotate about a point which produces a linear spring rate throughout the entire range of the suspension stroke. This system thus may be subject to "bottoming out" or complete collapse of the suspension. If such bottoming out is to be avoided, relatively sturdy bumpers or similar elements must be employed.

In addition, the arrangement of the tension adjust assembly supporting the primary extension springs drives all of the load through the front flange of the upper seat support, requiring the provision of additional structural members and thus increasing the complexity of the system.

The ratchet-type and spring-assisted height adjust mechanisms of Brodersen et al. also exhibit several disadvantages and drawbacks. For instance, the ratchet mechanism contains small parts that require accurate alignment in order to function properly. The spring-assisted height adjust mechanism incorporates a latch mechanism formed integral with the arms and cam mechanism and which is dependent in operation on the mass applied to the seat support of the suspension, as well as the compression spring applying lifting forces to the seat support member during height adjust operations. The latch mechanism is therefore relatively difficult to unlatch because at least some of the forces of the compression springs and all of the forces resulting from the mass on the seat support must be overcome. The height adjust mechanism is also relatively difficult to assemble because it is directly connected to the main tension springs for the seat suspension.

OBJECTS AND SUMMARY OF THE INVENTION

It is therefore an object of the invention to provide a mechanical seat suspension which is relatively simple in construction and operation and which can incorporate either a ratcheting or spring assisted height adjust mechanism.

It is also an object of the invention to provide a support arm assembly that has the ability to contour the ride characteristics of the suspension for a broad range of potential applications.

In accordance with this aspect of the invention, the seat suspension system comprises a mounting mechanism swingably connected to one of the first and second support members, and a support arm assembly having a first end portion pivotally mounted on the mounting mechanism and a second end portion operatively connected to the other of the first and second support members. The support arm assembly includes a first support arm having a cam provided thereon. Also provided is a cam follower which engages the cam, with the cam and the cam follower interacting to suspend the first support member with respect to the second support member when a load is imposed on the first support member.

Preferably, the mounting mechanism comprises a link having a first end swingably connected to the one support member and a second end pivotally mounted on the first support arm. The support arm assembly preferably further comprises a second support arm having a first end pivotally connected to the first support arm and a second end engaging the other support member.

Another object of the invention is to provide a seat suspension mechanism offering different resistances to displacement of the seat support member at different seat support member levels.

In accordance with this aspect of the invention, the seat suspension system includes a support arm assembly having a first end portion operatively connected to one of the first and second support members and a second end portion operatively connected to the other of the first and second support members; a cam which is provided on the support arm assembly and which presents a spring rate which progressively varies along the surface of the cam; and a cam follower which engages the cam. The cam and the cam follower interact to suspend the first support member with respect to the second support member when a load is imposed on the first support member.

Preferably, the cam has (1) a first end portion presenting a first, decreasing spring rate, (2) an intermediate portion presenting a second, linear spring rate, and (3) a second end portion presenting a third, increasing spring rate. The cam configuration is designed so that it is not limited to three different rates. The cam may be shaped so as to provide any number of rates defined by the scope of potential applications.

Still another object of the invention is to provide a seat suspension system having a ratchet-type height adjust mechanism which is simple in construction and operation.

In accordance with this aspect of the invention, a system of the type described above employs as the height adjust mechanism a detent provided on one of the first and second support arms, and a detent receiver provided on the other of the first and second support arms. The detent receiver preferably includes a plurality of notches formed in the other support arm. Preferably, the detent is pivotally mounted on the one support arm and includes 1) a locking pawl which is capable of engaging the notches in the detent receiver, and 2) a resetting device which selectively engages the detent receiver to move the detent to a position in which the locking pawl is incapable of engaging the notches. A torsion spring is mounted on the other support arm and is pivotable upon operation of the resetting device from a first position biasing the locking pawl towards the detent receiver to a second position biasing the resetting device towards the detent receiver.

Yet another object of the invention is to provide a seat suspension system having a spring assisted height adjust mechanism which is simple in construction but the use of which requires minimal effort by the operator.

In accordance with this aspect of the invention, the height adjust mechanism includes a latch mechanism movable with respect to one of the first and second support arms from a first position preventing relative movement of the first and second support arms to a second position permitting relative movement of the first and second support arms, and a compression spring which is operatively connected to at least one of the first and second support arms and which biases the one support arm towards a position increasing the distance between the first and second support members.

Preferably, a pin is formed on the other support arm and the latch mechanism selectively engages the pin, is pivotally connected to the one support arm, and has notches formed thereon for engaging the pin when the latch mechanism is pivoted to the first position. A return spring biases the latch mechanism towards the first position.

Other objects, features, and advantages of the present invention will become apparent to those skilled in the art from the following detailed description. It should be understood, however, that the detailed description and specific examples, while indicating preferred embodiments of the present invention, are given by way of illustration and not of limitation. Many changes and modifications within the scope of the present invention may be made without departing from the spirit thereof, and the invention includes all such modifications.

BRIEF DESCRIPTION OF THE DRAWINGS

The above and further objects of the invention will become more readily apparent as the invention is more clearly understood from the detailed description to follow, reference being made to the accompanying drawings in which like reference numerals represent like parts throughout, and in which.

DETAILED DESCRIPTION OF THE PREFERRED EMBODIMENTS

1. Resume

Figure 1:
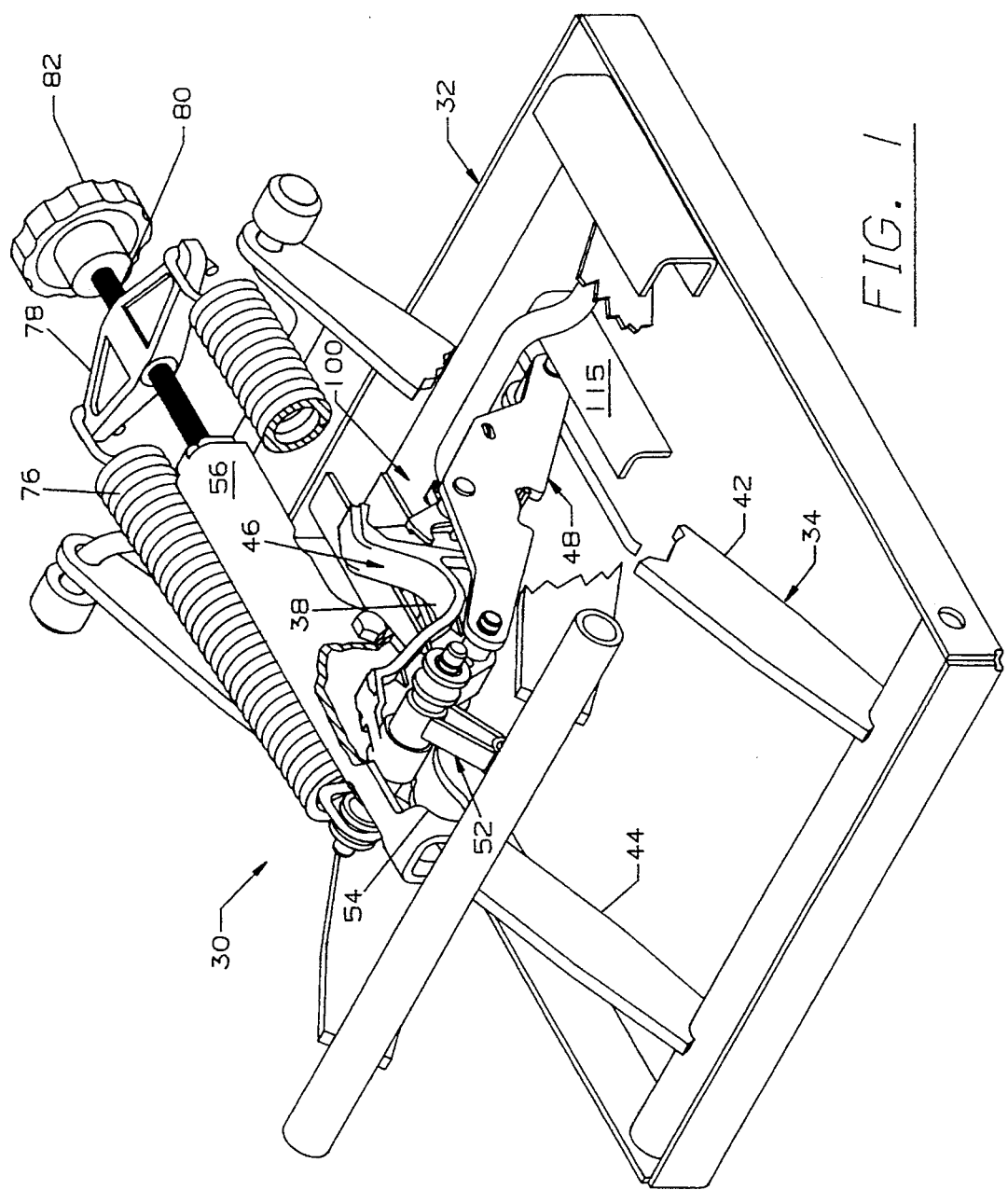
FIG. 1 is perspective view of a portion of a seat suspension system constructed in accordance with a preferred embodiment of the invention and incorporating a ratchet height adjust mechanism.
Figure 2:
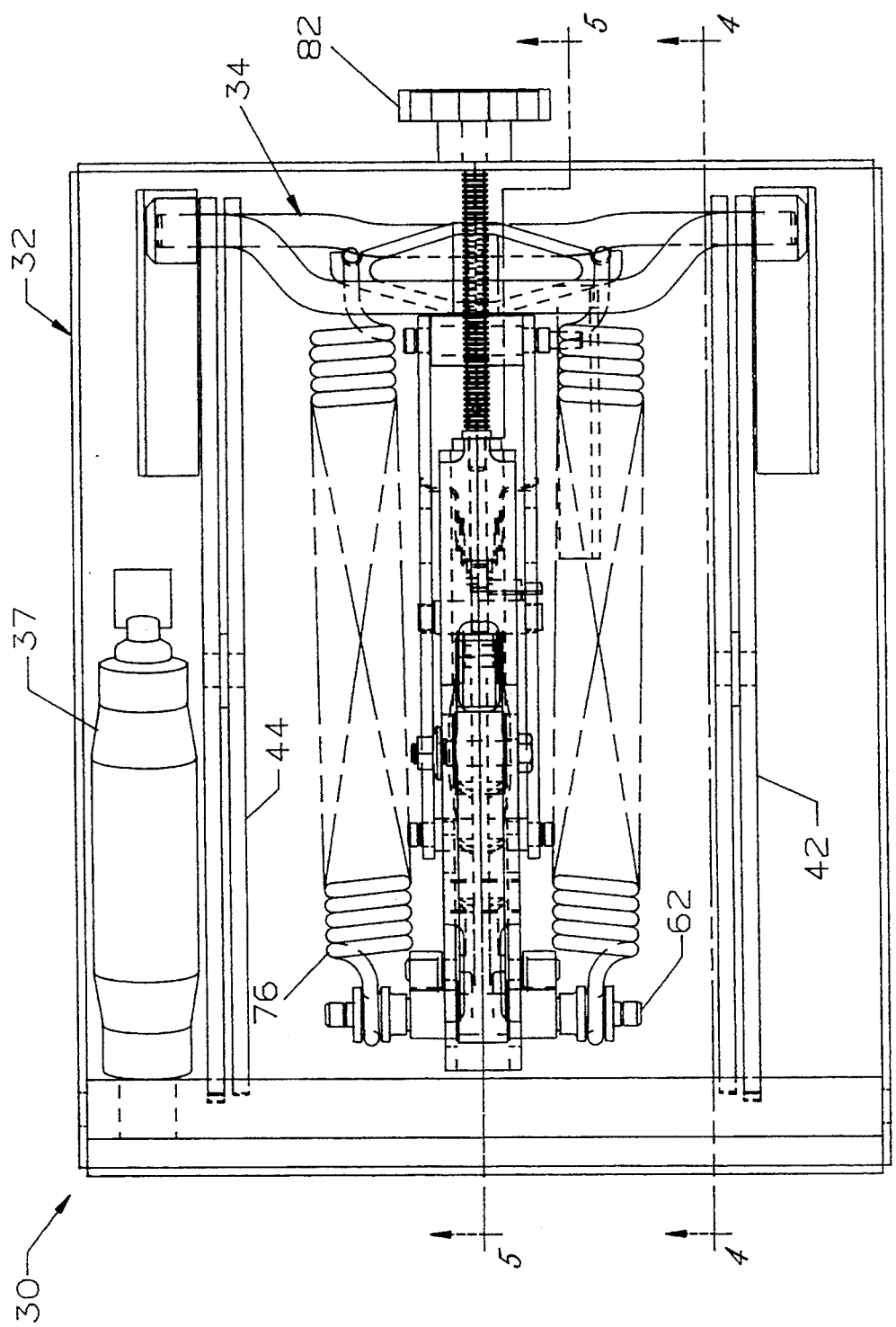
FIG. 2 is a plan view of the seat suspension system of FIG. 1.
Figure 3:
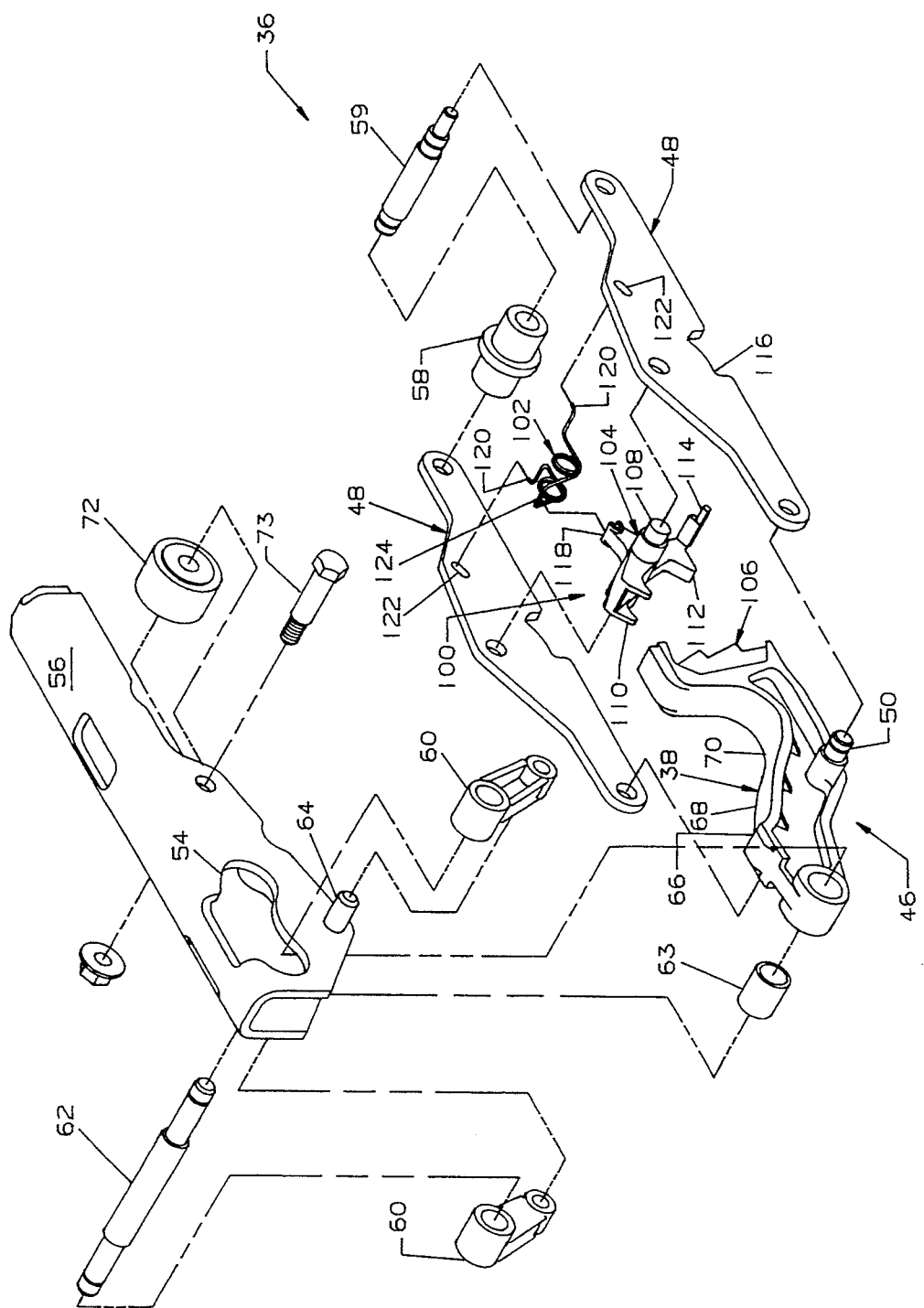
FIG. 3 is an exploded perspective view of a portion of the seat suspension system of FIGS. 1 and 2.
Figure 4:
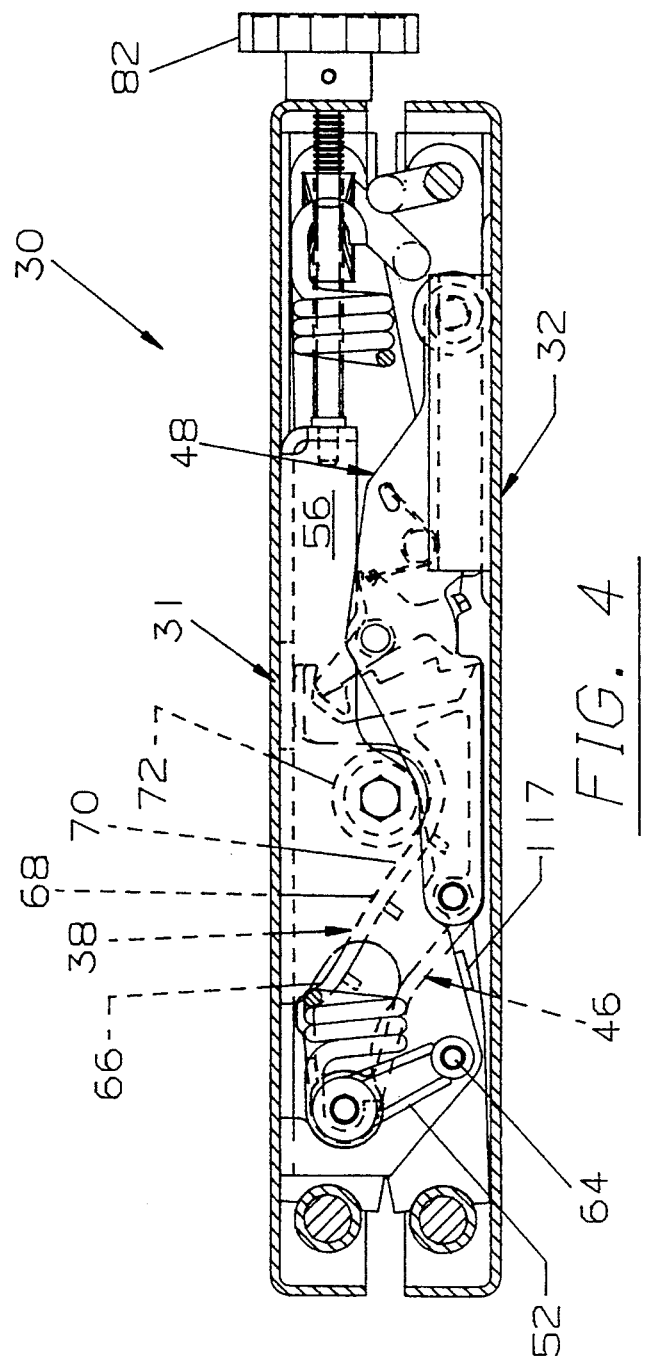
FIG. 4 is a sectional elevation view of the seat suspension system taken along lines 4—4 in FIG. 2.
Figure 5:
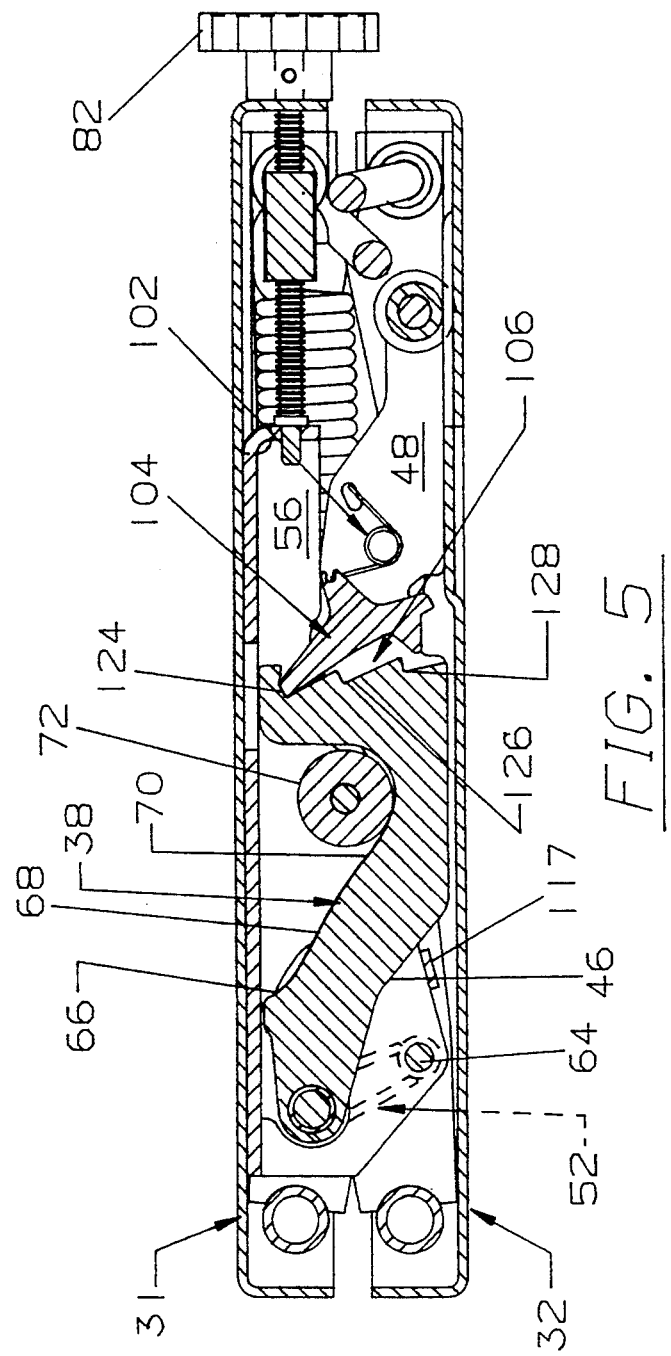
FIG. 5 is a sectional elevation view of the seat suspension system taken along lines 5—5 in FIG. 2.

Pursuant to the invention, a seat suspension system is provided in which the seat support member and base member are connected by support arms which cooperate with a spring suspension so as to suspend loads imposed on the seat. The support arms are connected to one of the seat support member and base member by a mounting mechanism. A cam element acts upon at least one of the seat support member and the base member and presents a cam surface offering a resistance to the motion of the accompanying cam follower which varies depending upon the position of the seat support member. The suspension system preferably includes a height adjust mechanism for adjusting the unloaded distance between the seat support member and the base member. The height adjust mechanism may be either a ratchet mechanism which is operated by lifting the seat support member, or a spring assisted mechanism which is operable independently of the main suspension springs and which automatically biases an unloaded seat support member upwardly.

2. System Overview and Cam Operated Suspension

Referring now to FIGS. 1-20, a cam operated seat suspension system 30 constructed in accordance with the invention supports a seat support member (which, in the illustrated embodiment comprises a seat support plate assembly 31) on a base member or base plate assembly 32. Base plate assembly 32 is fixed from vertical movement but may be moveable fore and aft in a manner which is, per se, well known. Suspension 30 preferably includes a lateral support mechanism 34; a support arm assembly 36; a mounting mechanism 52 for mounting the support arm assembly to one of the first and second members 31 and 32; tension springs 76 applying a biasing force to support arm assembly 36, and a shock absorber 37. The support arm assembly 36 includes a cam 38 for permitting compression of the suspension system 30 against the force of tension springs 76 when a load is imposed on the seat support plate assembly 31. Support arm assembly 36 further includes a height adjust mechanism for adjusting the unloaded height of the seat support plate assembly 31.

The lateral support mechanism 34 preferably comprises a pair of laterally opposed folding scissor arm mechanisms 42 and 44, each of which has a first end pivotally connected to one of the support members and a second end mounted, via rollers, in sliding engagement with the other of the support members. Scissor arm mechanisms 42 and 44 fold when the seat support member 31 is lowered. The scissor arm mechanisms need to be sufficiently sturdy to prevent the seat from twisting when an off-center load is imposed on the seat support member 31.

Support arm assembly 36 includes first and second support arms 46 and 48 connected by a pivot pin 50 which, in the illustrated embodiment, is formed integral with first support arm 46. Two support arms 48 are preferably provided, one on either side of the first support arm 46. The upper end of the first support arm 46 is swingably connected to the seat support plate assembly 31 by the mounting mechanism 52. The second, lower end of each of the second support arms 48 cooperates with a roller 58 slidably supported on the base plate assembly 32. Roller 58 is centrally mounted on a transverse shaft 59 connecting the arms 48. It should be understood that the orientation of the arms 46 and 48 could be reversed with the first support arm 46 and the associated support mechanism being connected to the base plate assembly 32 and with the second support arm 48 being slidably supported on the seat support plate assembly 31.

In the illustrated embodiment, the support or mounting mechanism takes the form of a link 52 swingably travelling in a generally arcuate clearance slot 54 formed in a generally U-shaped support 56 affixed to the seat support plate assembly 31. Link 52 has two arms 60, each having an upper end swingably travelling in the clearance slot 54 of the support 56 and pivotally attached to a shaft 62 extending through the clearance slot 54 and interconnecting the arms 60. The shaft 62 joining the arms 60 also pivotally supports the upper end of support arm 46 via a bushing 63. The lower end of each of the arms 60 is pivotally connected to a depending portion of support 56 by a respective pivot pin 64 which, in the illustrated embodiment, is formed integral with support 56. This arrangement permits the support arm assembly 36 to swing about the support 56 through a semi-circular arc the radius of which is defined by the length of arm 60 and the arc-length of which is defined by the effective arc-length of clearance slot 54.

Cam 38 is preferably formed on an upper surface of first support arm 46 and cooperates with a cam follower 72 rotatably mounted on support 56 by a pin 73. Cam 38 includes a first end portion 66, an intermediate portion 68, and a second end portion 70. The portions 66, 68, and 70 coact with cam follower 72 and tension springs 76 so as to present progressively increasing resistance to downward movement of the seat support plate assembly 31. In the illustrated embodiment, this increased resistance is achieved by forming the first end portion 66 so that it is curved in a direction presenting a decreasing spring rate, by forming the intermediate portion 68 to present a linear or generally linear spring rate, and by curving the second end portion 70 so as to present an increasing spring rate.

The seat support plate assembly 31 is normally maintained in its uppermost position by tension springs 76. Each spring 76 has a first end operatively connected to the seat support plate assembly 31 by a hanger 78 threadedly mounted on a rod 80 rotatably connected to support 56, and has a second end connected to the shaft 62 supporting the first support arm 46 and the link 52. The tension in springs 76 can be adjusted by operation of a handle or knob 82, which remains stationary during normal operation of the suspension system and which is unlikely to interfere with the legs of or cause discomfort to the operator.

The cam operated suspension system operates as follows.

The suspension system normally assumes the position illustrated in FIGS. 1, 7-13, and 17-20 in which the seat support plate assembly 31 is forced by the springs 76 into its uppermost position in which the cam follower 72 rests on the upper end of first end portion 66 of cam 38. When a load is imposed on the seat support plate assembly 31 to lower the support plate assembly, the cam follower 72 rides along the surface of the cam 38 against the force of the springs 76, thus causing the link 52 to swing about pivot pin 64. This initial downward movement is facilitated by the low resistance presented by the first end portion 66 of cam 38.

Figure 6:
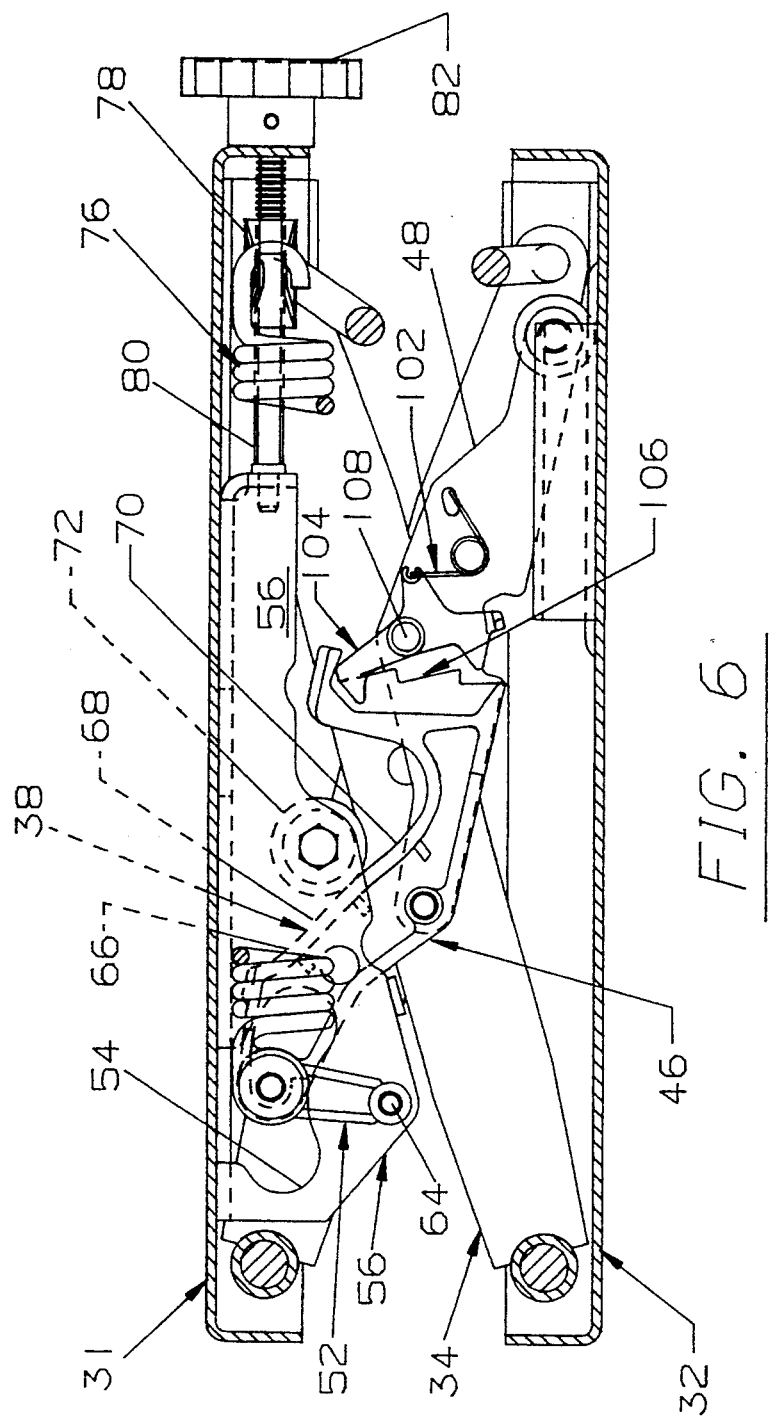
FIGS. 6 through 12 are sectional elevation views of the seat suspension system as illustrated in FIG. 4 but illustrating the suspension system in various operational modes.

As the load on seat support plate assembly 31 increases, the cam follower 72 rolls along the intermediate portion 68 of cam 38 as illustrated in FIG. 6, encountering a resistance which increases at a relatively constant rate. A load which is heavy enough to completely collapse the seat will cause the cam follower 72 to engage the second end portion 70 of cam 38 as illustrated in FIGS. 2, 4, 5, 14, and 16. The high resistance offered by this end portion prevents or at least inhibits the seat assembly from "bottoming out." This offers the advantage of obviating the need for sturdy bumpers which would otherwise be required, or at least permitting the use of much less substantial bumpers. During this motion, the link 52, cam follower 72, and first arm 46 coact to pivot the cam 38 about a point which varies with respect to seat support assembly 31, thus permitting flatter folding of the seat. When a load is removed from the seat support plate assembly 31, the tension springs 76 return the seat support plate assembly 31 to its initial position.

Because the suspension assembly drives all of the loads from the primary extension springs 76 into the support 56, the number of parts and complexity of the assembly 36 is reduced.

The suspension system as thus far described need not incorporate two mutually pivotable arm members. Rather, the members 46 and 48 could be fixed together or could be replaced by a single integral member. However, it is preferred that a height adjust mechanism be provided to adjust the unloaded height of the seat support plate assembly 31 relative to the base plate assembly 32. Such height adjust mechanisms could take many forms. Descriptions of two especially preferred mechanisms, which may be interchangeably mounted in the suspension assembly due to the design of the assembly, follow.

3. Ratchet Height Adjust Mechanism

Referring now to FIGS. 1–12, a height adjust mechanism 100 useable with the present invention takes the form of a ratchet mechanism having a torsion spring 102, a detent 104, and a detent receiver 106. The spring 102 and detent 104 of the illustrated embodiment are pivotally mounted on the second support arms 48, while the detent receiver 106 is formed on the lower end of first support arm 46 and faces detent 104. However, it should be understood that the orientations of these members could be reversed, if desired.

Detent 104 is pivotally mounted on the second support arms 48 by a pivot pin 108 formed integral with the detent 104. Detent 104 has formed on the rear face thereof an upper locking pall 110 and a lower resetting pall 112, respectively. A stop 114 extends transversely from the lower end of detent 104 and extends through a groove 116 formed in one of the second support arms 48. Finally, a spring retainer 118 extends from the front face of detent 104.

Torsion spring 102 has laterally opposed depending ends 120 pivotally received in corresponding slots 122 formed in the support arms 48. The rear end of spring 102 forms a support bar 124 engaging the spring retainer 118 of detent 104. Spring 102 is pivotable about slots 122 from a first position biasing the locking pall 110 towards the detent receiver 106 and thus biasing the resetting pall 112 away from the detent receiver, through a center position, and to a second (over-center) position biasing the resetting pall 112 towards the detent receiver 106 and biasing the locking pall 110 away from the detent receiver.

Detent receiver 106 preferably has three notches 124, 126, and 128 formed therein which receive the locking pall 110 of detent 104 in low, medium, and high height adjust positions, respectively. A stop 130 is formed on the upper end of detent receiver 106, and a resetting lug 132 is formed on the lower end.

Adjustment of the unloaded height of the seat support plate assembly 31 is performed as illustrated in FIGS. 7–12.

Figure 7:
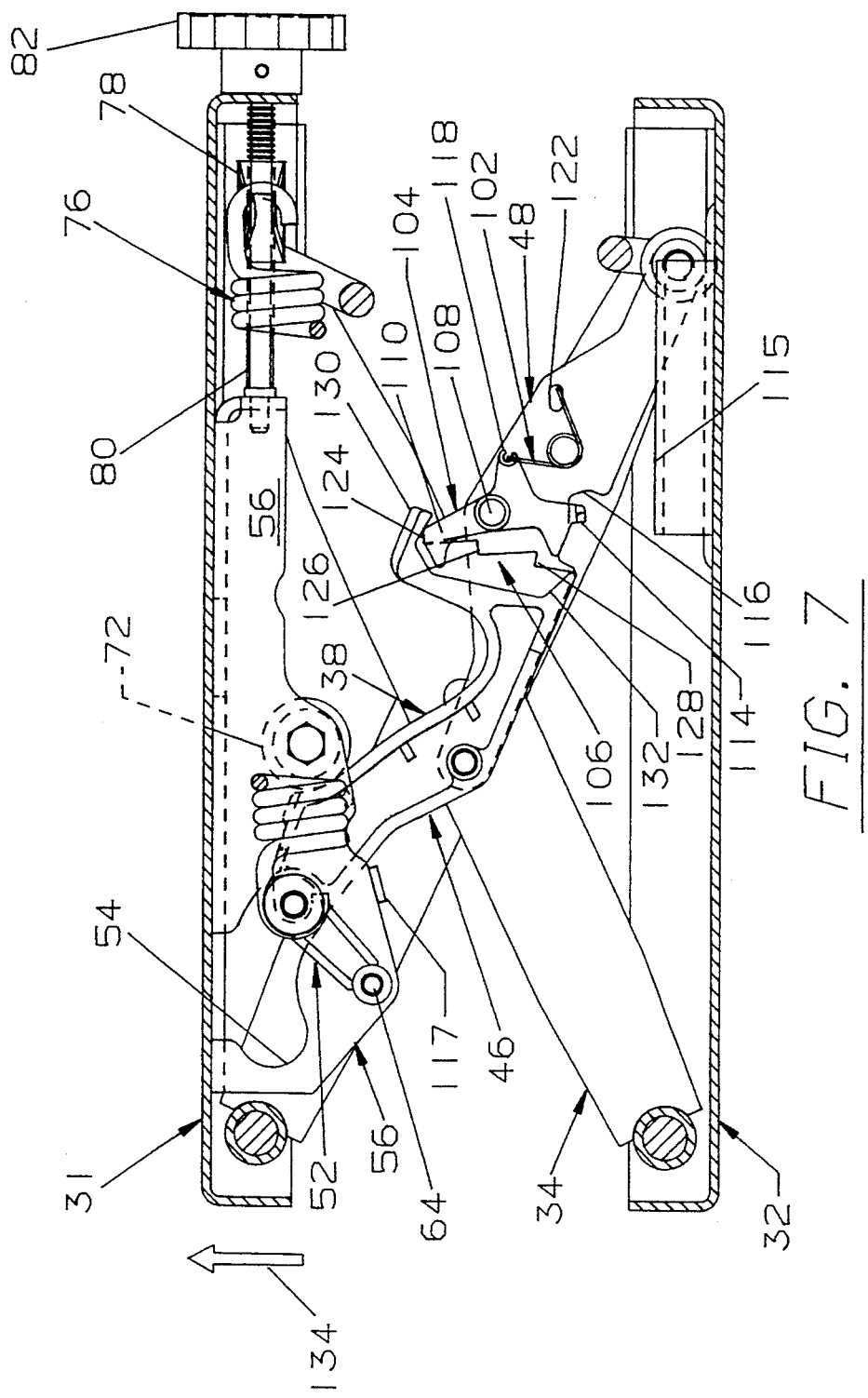
Figure 8:
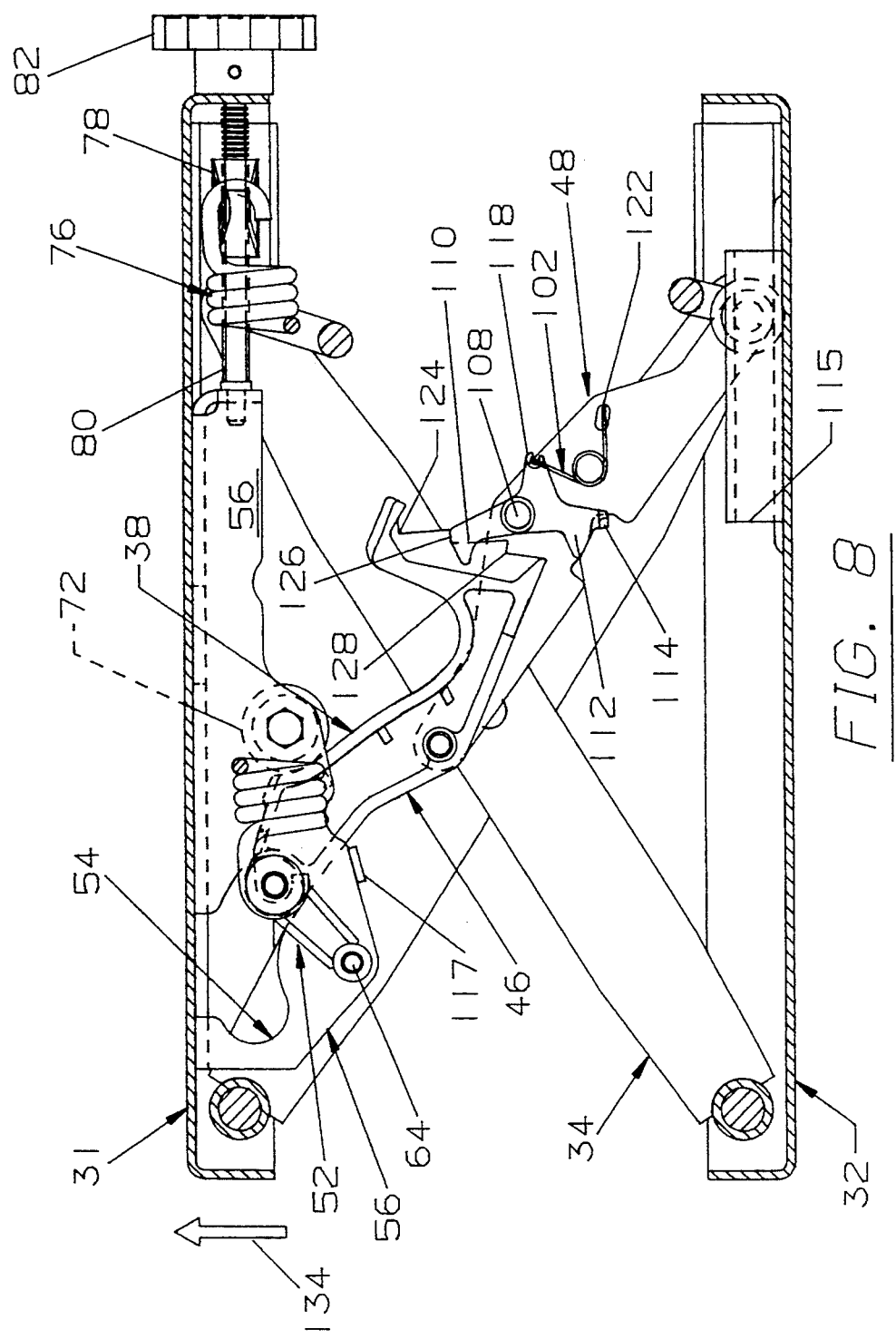

In the low height adjust position illustrated in FIG. 7, the locking pall 110 of detent 104 is received in the first notch 124 of detent receiver 106. An operator can raise the seat by removing his or her weight therefrom and by pulling upwardly on the seat support plate assembly 31 as illustrated by the arrow 134 in FIGS. 7–11. Lifting the seat in this manner engages first support arm 46 with plate 117 formed integral with support 56, and engages pin 59 with an angled element formed integral with base plate 32, thus causing the locking pall 110 to ride down the tooth defining the notches 124 and 126, against the force of torsion spring 102, to the position illustrated in FIG. 8 in which the spring 102 biases the locking pall 110 into the notch 126, thus locking the seat assembly 30 in the mid height adjust position. Further movement of seat support plate assembly 31 in the direction of arrow 134 locks the seat support plate assembly 31 in the high height adjust position illustrated in FIG. 9.

Figure 9:
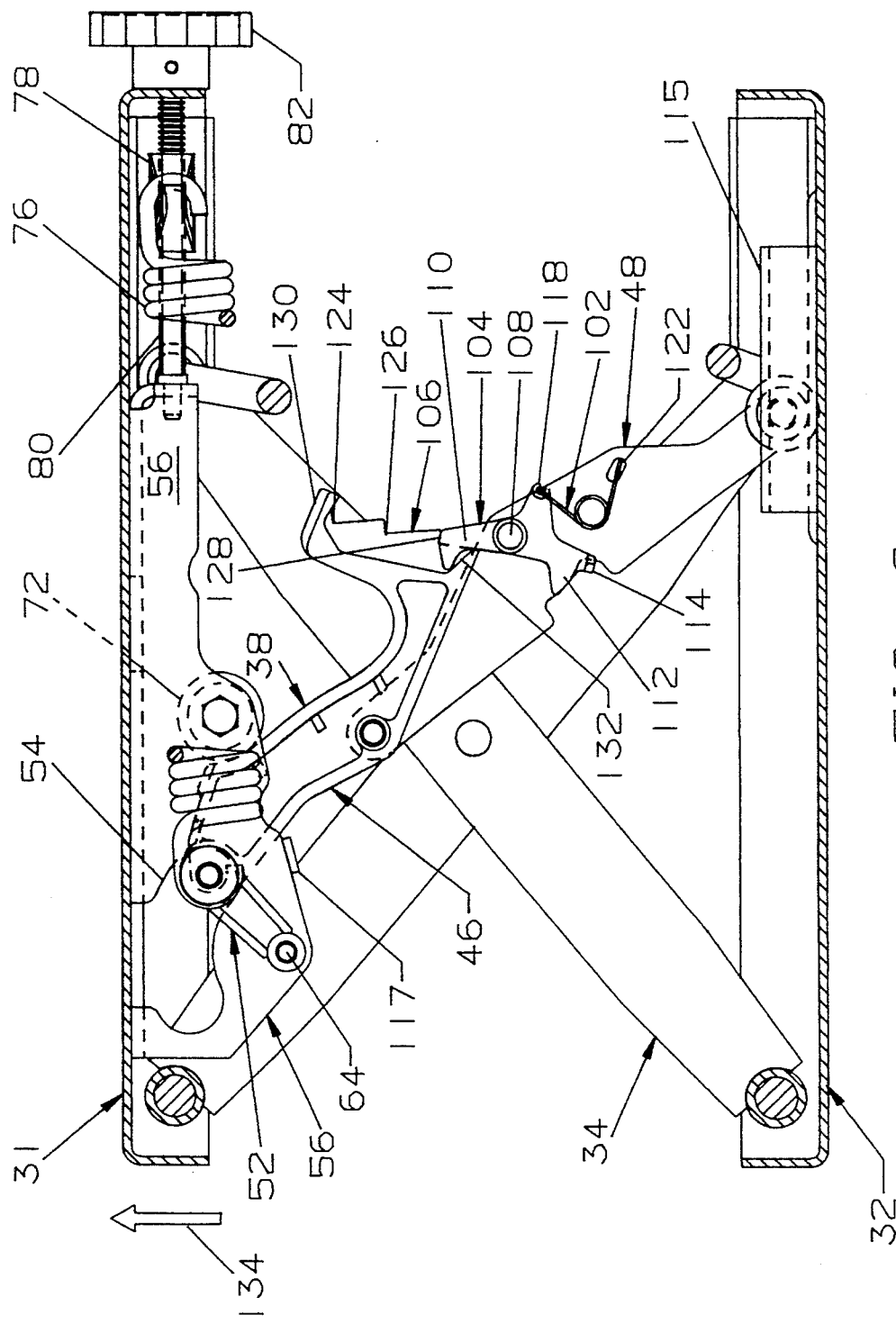
Figure 10:
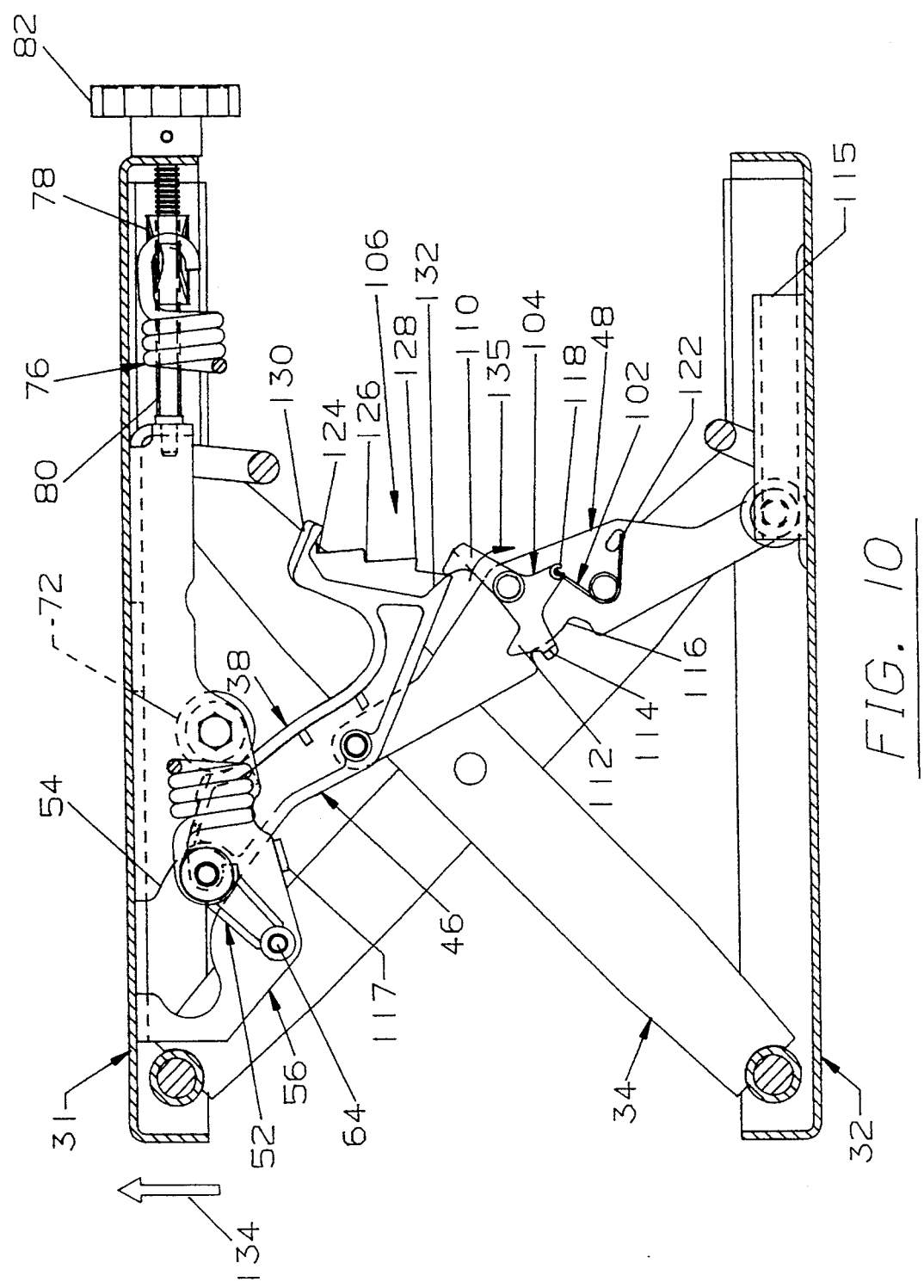
Figure 11:
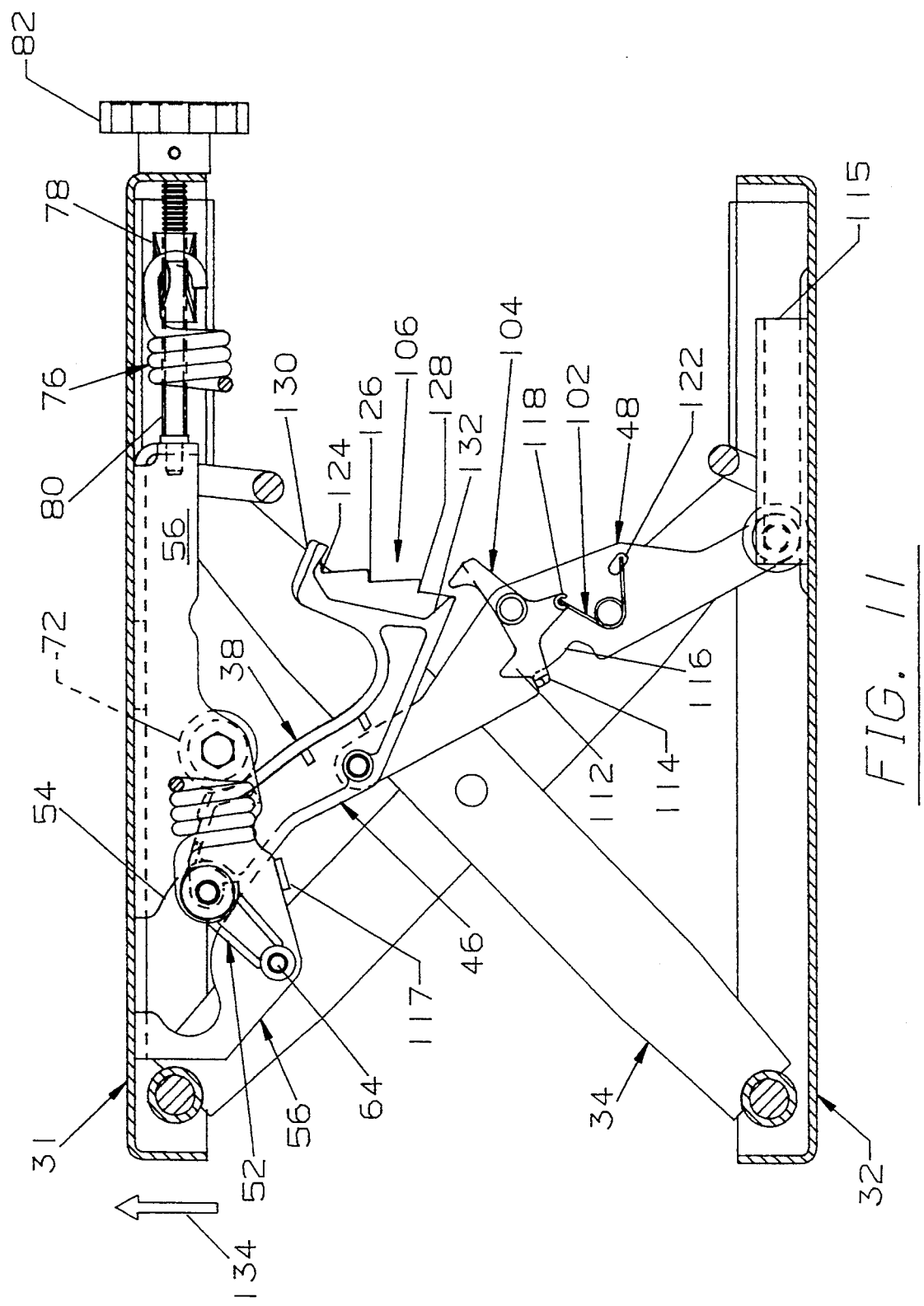

Assuming now that the operator wishes to lower the seat assembly, he or she raises the seat support plate assembly 31 beyond the high height adjust position illustrated in FIG. 9 and through the position illustrated in FIG. 10 in which the locking pall 110 engages the resetting lug 132. This engagement pivots the detent 104 in the direction of arrow 135 so as to pivot the torsion spring 102 through an over-the-center position to the position illustrated in FIG. 10 in which spring 102 biases the locking pall 110 away from the detent receiver 106 and biases the resetting pall 112 towards the detent receiver. As illustrated in FIG. 11, this pivoting is limited by engagement of the stop 114 of detent 104 with the rear or upper end of groove 116 in the arm 48.

Figure 12:
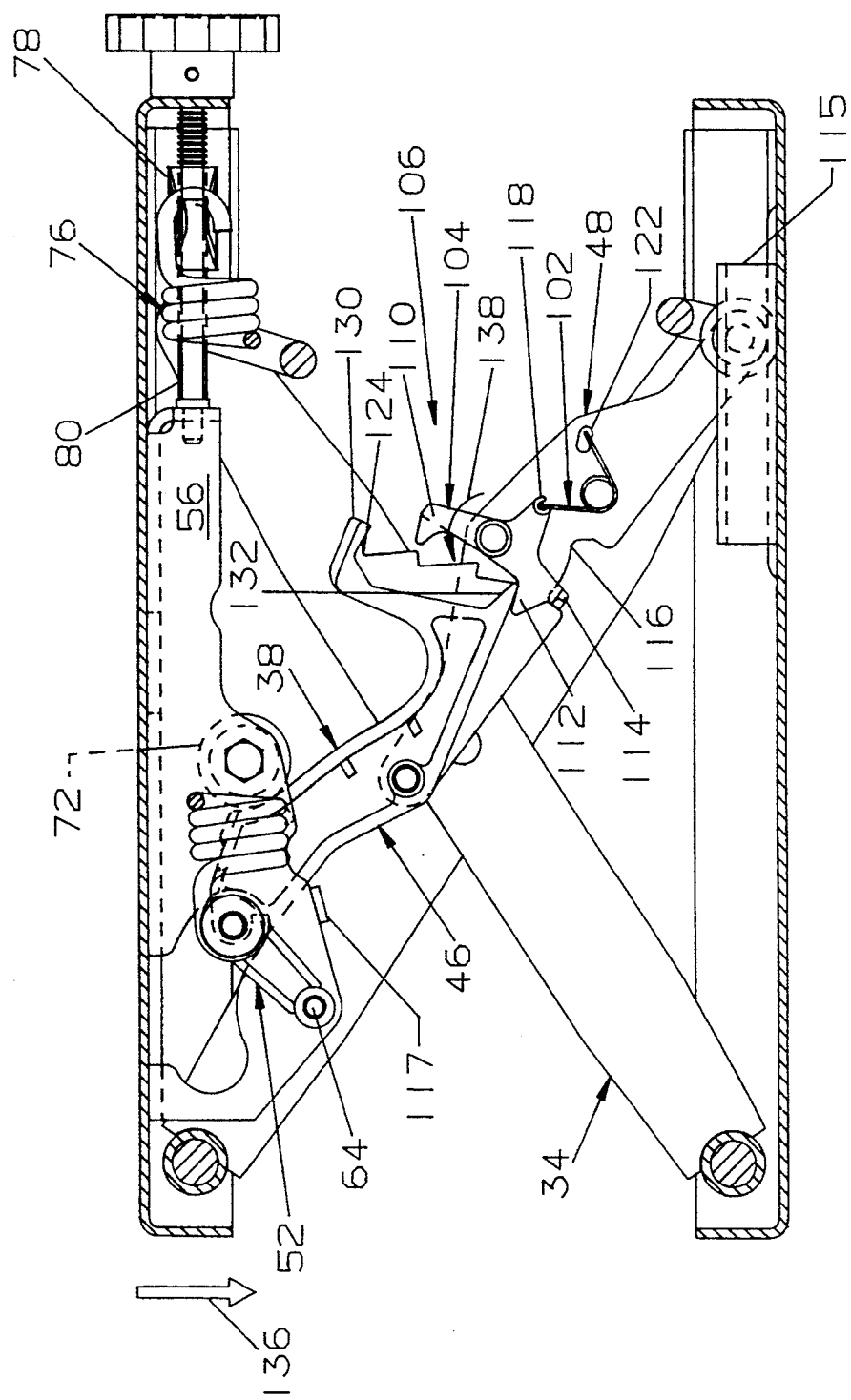
Figure 13:
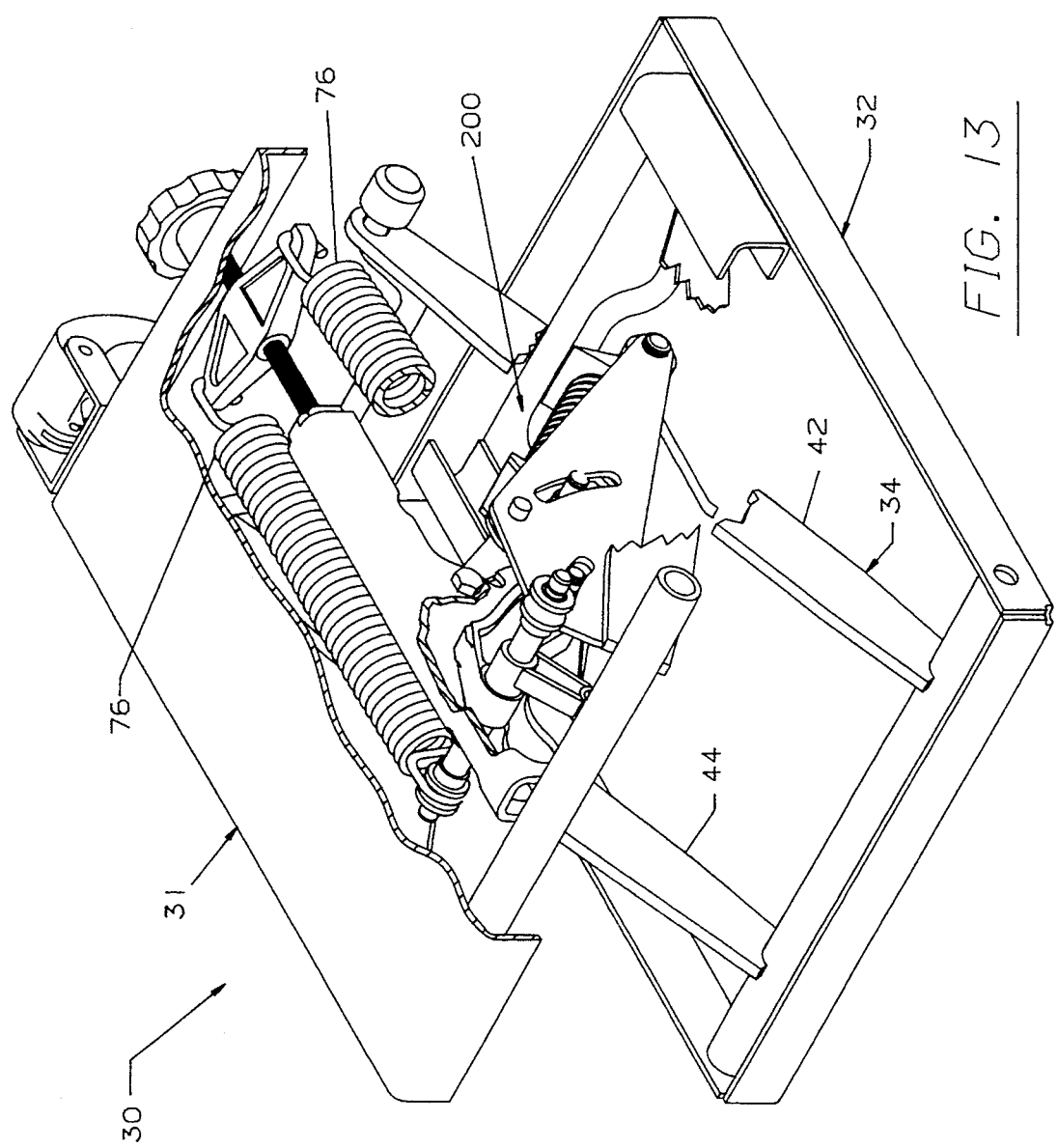
FIG. 13 is a perspective view of the inventive seat suspension system incorporating a spring assisted height adjust mechanism.
Figure 14:
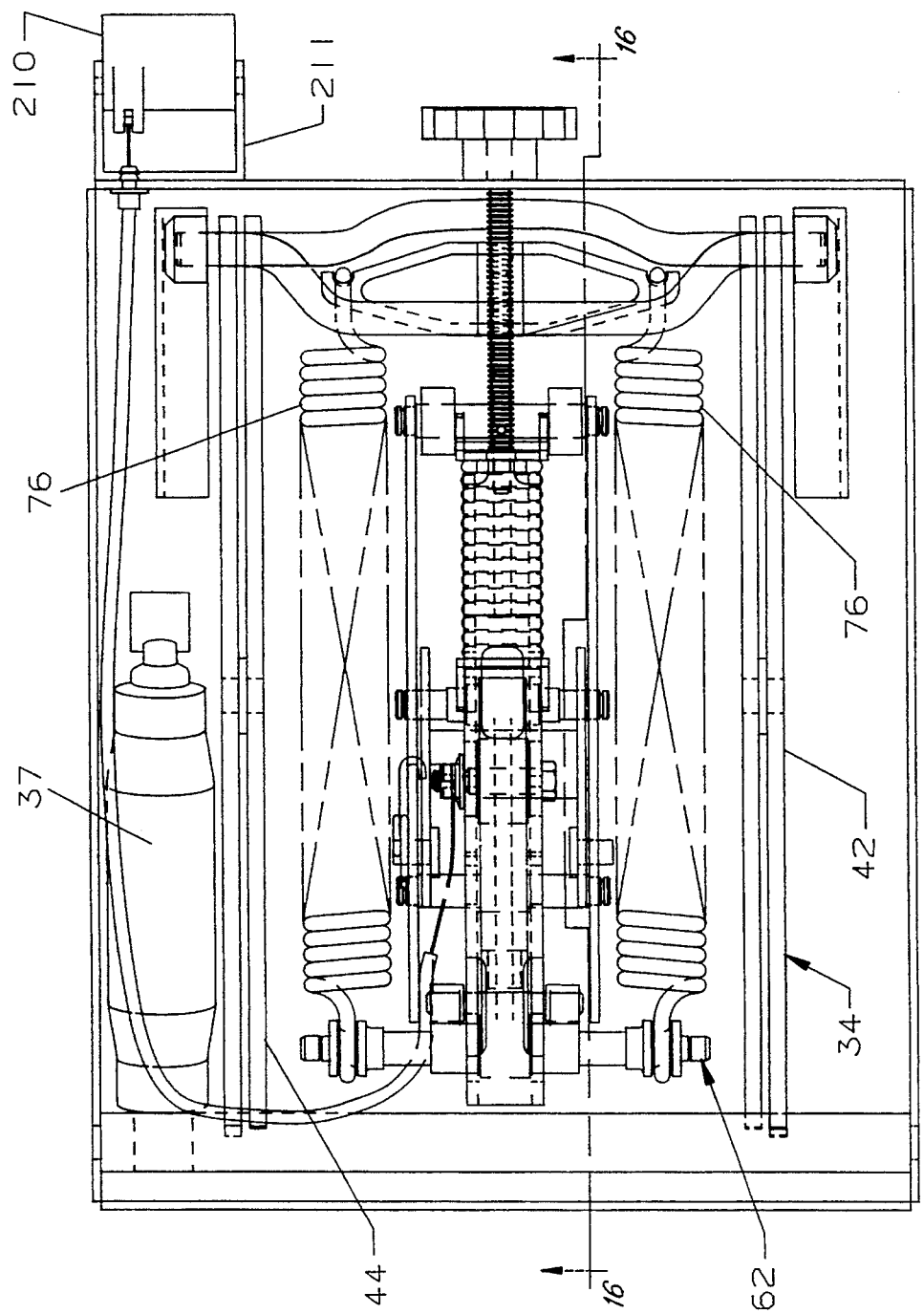
FIG. 14 is a plan view of the seat suspension system of FIG. 13.
Figure 15:
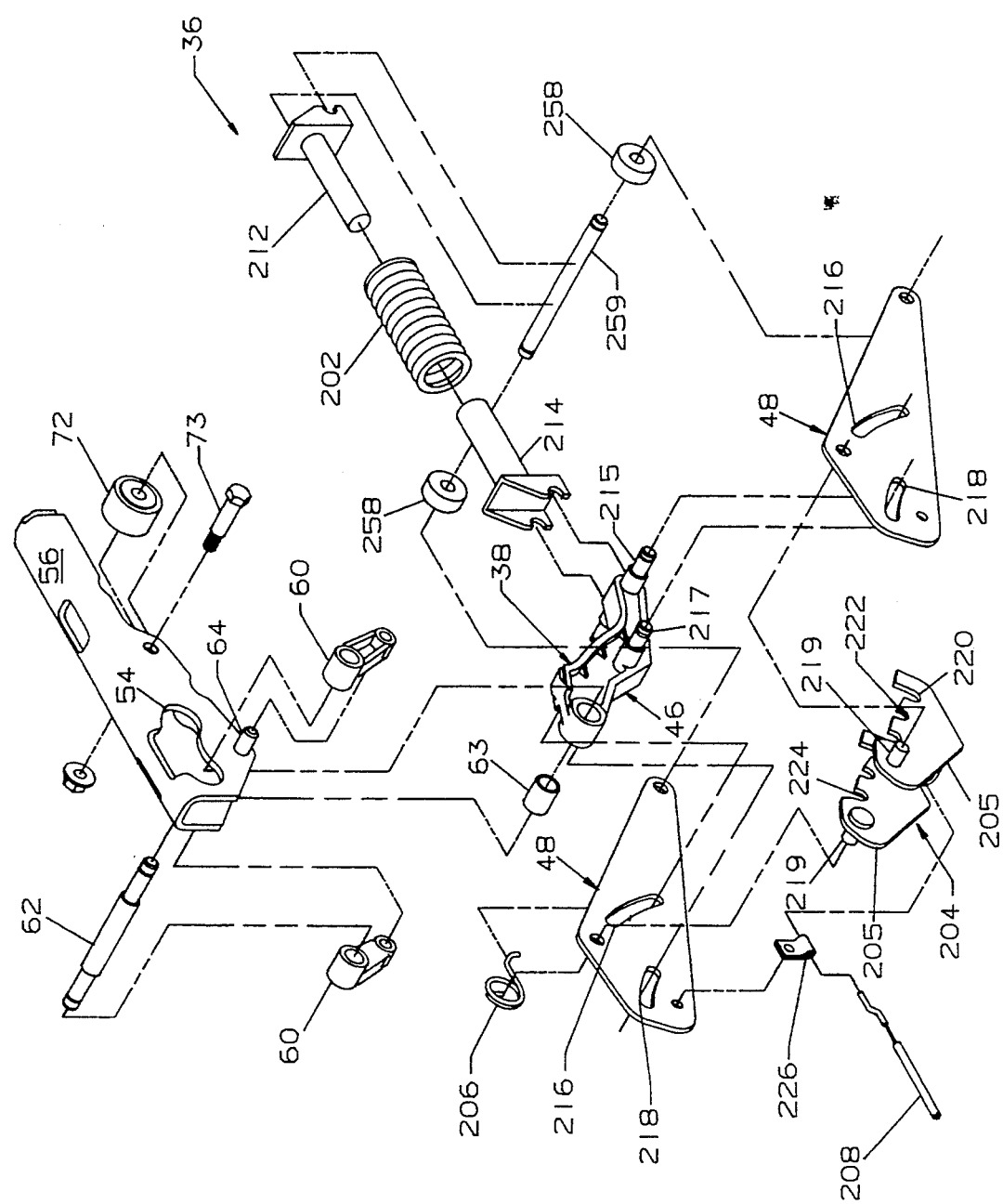
FIG. 15 is an exploded perspective view of a portion of the suspension system of FIGS. 13 and 14.
Figure 16:
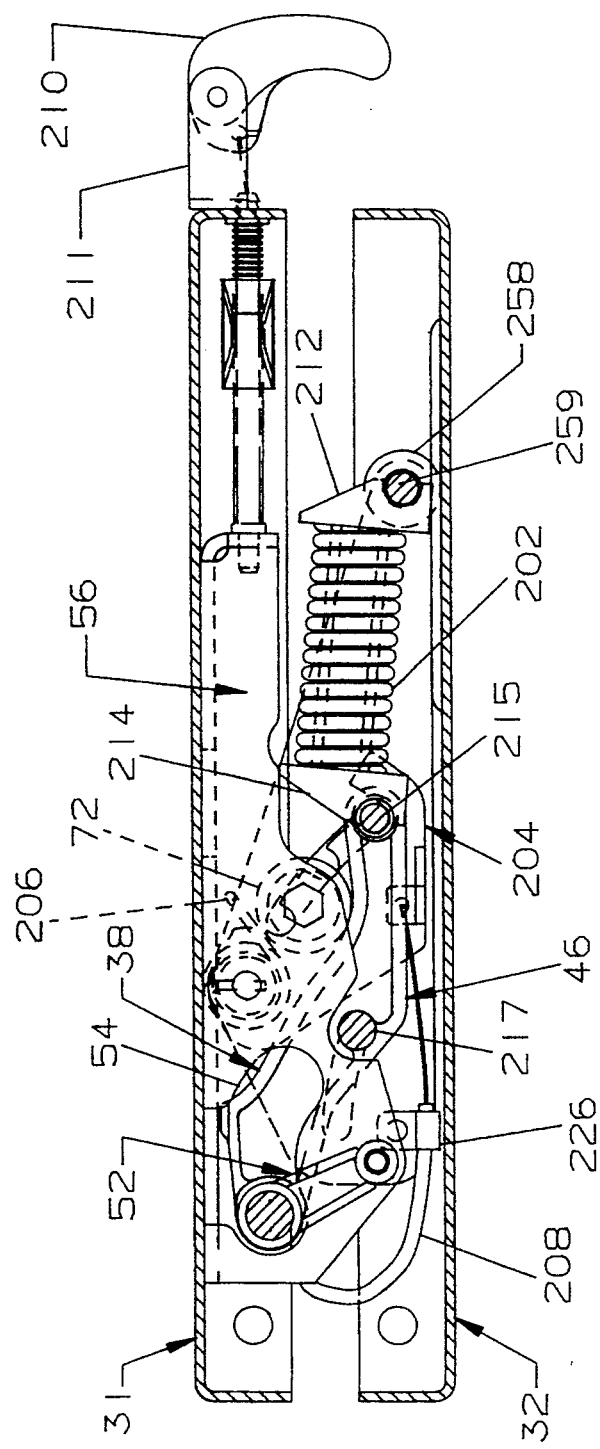
FIG. 16 is a sectional elevation view taken along the lines 16—16 in FIG. 14.

The seat support plate assembly 31 can now be lowered in the direction of arrow 136 in FIG. 12 without interference from the locking pall 110. As seat support plate assembly 31 is lowered, the resetting pall 112 engages the resetting lug 132 and rotates the detent in the direction of arrow 138 to pivot the torsion spring 102 back towards its original position biasing the locking pall 110 towards the detent receiver 106. Downward movement of the seat support plate assembly 31 is limited by stop 130, which assures that locking pall 110 will lockingly engage notch 124.

The height adjust mechanism described above has the advantage of being relatively simple in construction, but requires that the operator manually lift the seat support plate assembly to adjust its height. This can be disadvantageous if relatively heavy seat assemblies are employed. Accordingly, it may in some circumstances be desirable to employ a spring assisted height adjust mechanism which will now be described.

4. Spring Assisted Height Adjust Mechanism

Referring now to FIGS. 13–20 a spring assisted height adjust mechanism 200 is designed to permit the unassisted raising of seat support plate assembly 31 of suspension 30 or to at least dramatically reduce the lifting forces required to raise the seat support plate assembly. Mechanism 200 may be used to adjust the same cam operated seat suspension described in section 2 above. The tension springs, scissor arm mechanisms, and associated elements of the cam operated suspension mechanism 30, though present, have been omitted from FIGS. 15–20 to simplify the drawings.

Mechanism 200 includes a compression spring 202 connecting the first and second support arms 46 and 48; a latch mechanism 204 pivotally connected to the second support arms 48; a return spring 206 biasing the latch mechanism 204 towards an engaged position; and an actuator comprising a cable 208 which, when tensioned by a handle 210 pivotally secured to a clevis 211, disengages the latch mechanism 204 from the first support arm 46.

Compression spring 202 is preferably sufficiently strong to be capable of exerting a biasing force greater than the unloaded weight of the seat support plate assembly 31 and the seat supported by this assembly. In the illustrated embodiment, compression spring 202 has a lower end which is supported on a spring retainer 212 pivotally mounted on a support shaft 259 for rollers 258. Supporting the compression spring 202 on the same shaft 259 supporting the rollers 258 and positioning this spring proximate the lateral center line of the seat assembly minimizes parts and also prevents the mechanism from rocking or cocking in use. Spring 202 also has an upper end supported on a spring retainer 214 pivotally mounted on pins 215 extending laterally from the lower end of support arm 46.

To facilitate assembly, the spring retainers 212 and 214 do not have bores which mate with the shaft 259 and pins 215, but instead merely have semi-circular seats which engage the shaft 259 and pins 215, respectively. These retainers are held in position by the biasing force of compression spring 202. Each pivot pin 215 engages a generally arcuate slot 216 formed in a respective one of the arms 48. Other pivot pins 217 extend from the upper part of arm 46 and are received in corresponding slots 218 formed in support arms 48, thus guiding the second arms 48.

Latch mechanism 204 preferably includes two identical side walls 205 pivotally connected to the support arms 48 by pins 219 formed integral with side walls 205. One of the pins 219 also supports return spring 206. Spring 206 may take the form of a torsion spring as illustrated, or may take the form of an extension spring that is attached to the bottom of the latch 204 and the arms 48. Formed in each of the side walls 205 of latch mechanism 204 are three notches 220, 222, and 224 defining respective height adjust positions of the seat. In the illustrated embodiment, the individual notches are spaced from each other to provide increments of height adjust of approximately 1½". However, wider or narrow spacings, as well as fewer or more notches, could be provided, if desired. The latch mechanism 204 is biased towards its engaged position by return spring 206, and is pivoted out of its engaged position when tension is applied to cable 208, which is affixed to one of the walls 205 of the latch mechanism 204 by a clamp 226.

Handle 210 for tensioning cable 208 could be located anywhere where it is easily accessible by the operator. In the illustrated-embodiment this handle is mounted on the forward edge of the seat support plate assembly 31 proximate the knob 82 for controlling the tension in springs 76.

Operation of the spring assisted height adjust mechanism 200 will now be described with reference to FIGS. 17-20.

Figure 17:
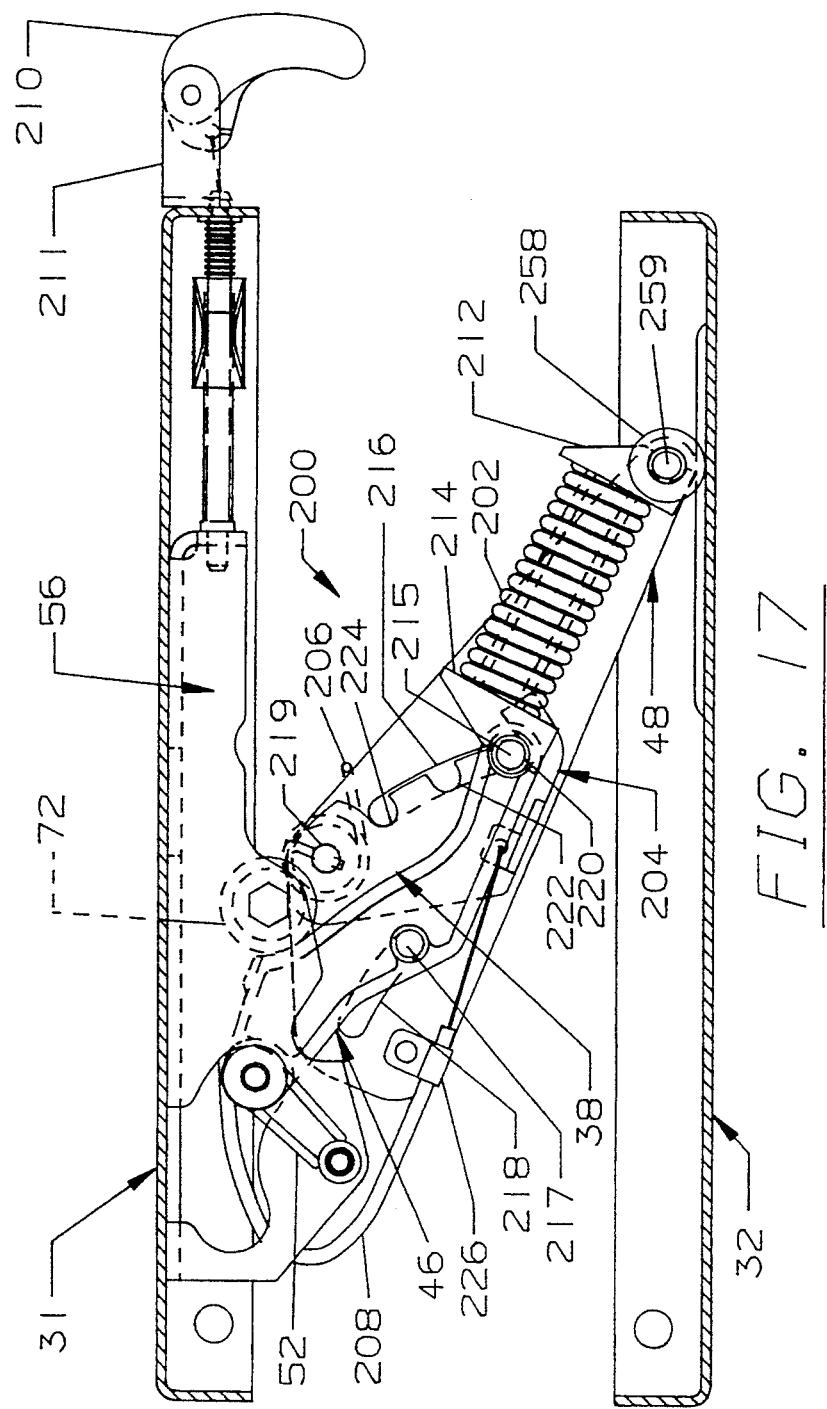
FIG. 17 through 20 are sectional elevation views of the suspension system as illustrated in FIG. 16 but illustrating the system in various operational modes.
Figure 18:
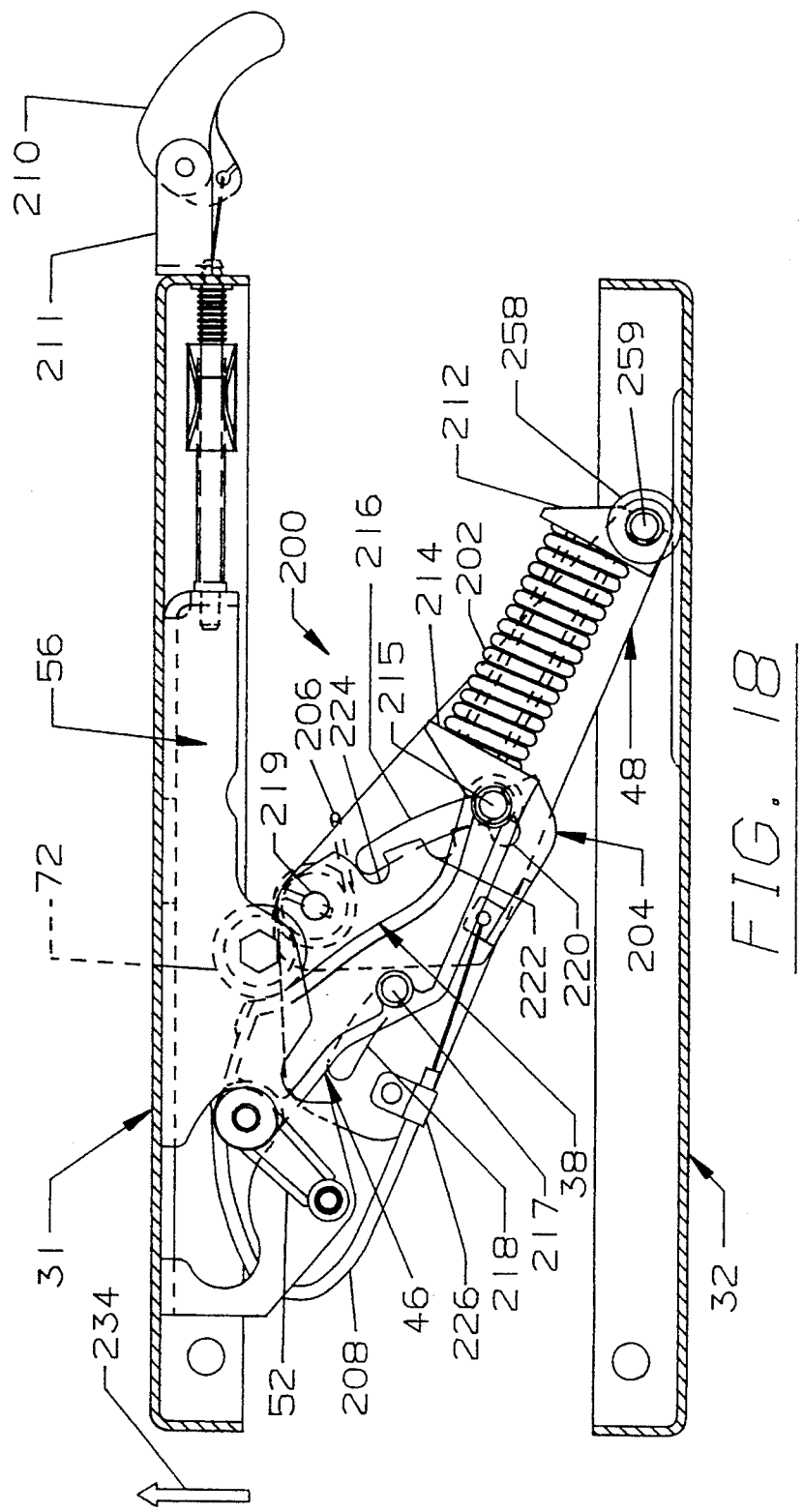

Assuming that the operator wishes to raise the seat from the lowermost position illustrated in FIG. 17, he or she pivots the handle 210 with respect to the clevis 211 as illustrated in FIG. 18, thus tensioning the cable 208 to pivot the latch mechanism 204 about pins 219 against the force of return spring 206. Operating the handle 210 requires little force because the primary force that needs to be overcome is that of the relatively weak spring 206. Pivoting the latch mechanism 204 in this manner disengages the notches 220 in the walls 205 of latch mechanism 204 from the pins 215 of first arm 46. Compression spring 202 will then force the arms 48 to pivot with respect to arm 46, thus raising the seat support plate assembly 31 in the direction of arrow 234 in FIGS. 18 and 19. During this motion, the pins 215 and 217 extending from arm 46 translate through the corresponding slots 216 and 218, rotating arms 48 about a point in space. If desired, bearings (not shown) may be provided in slots 216 and 218 to facilitate this motion.

Figure 19:
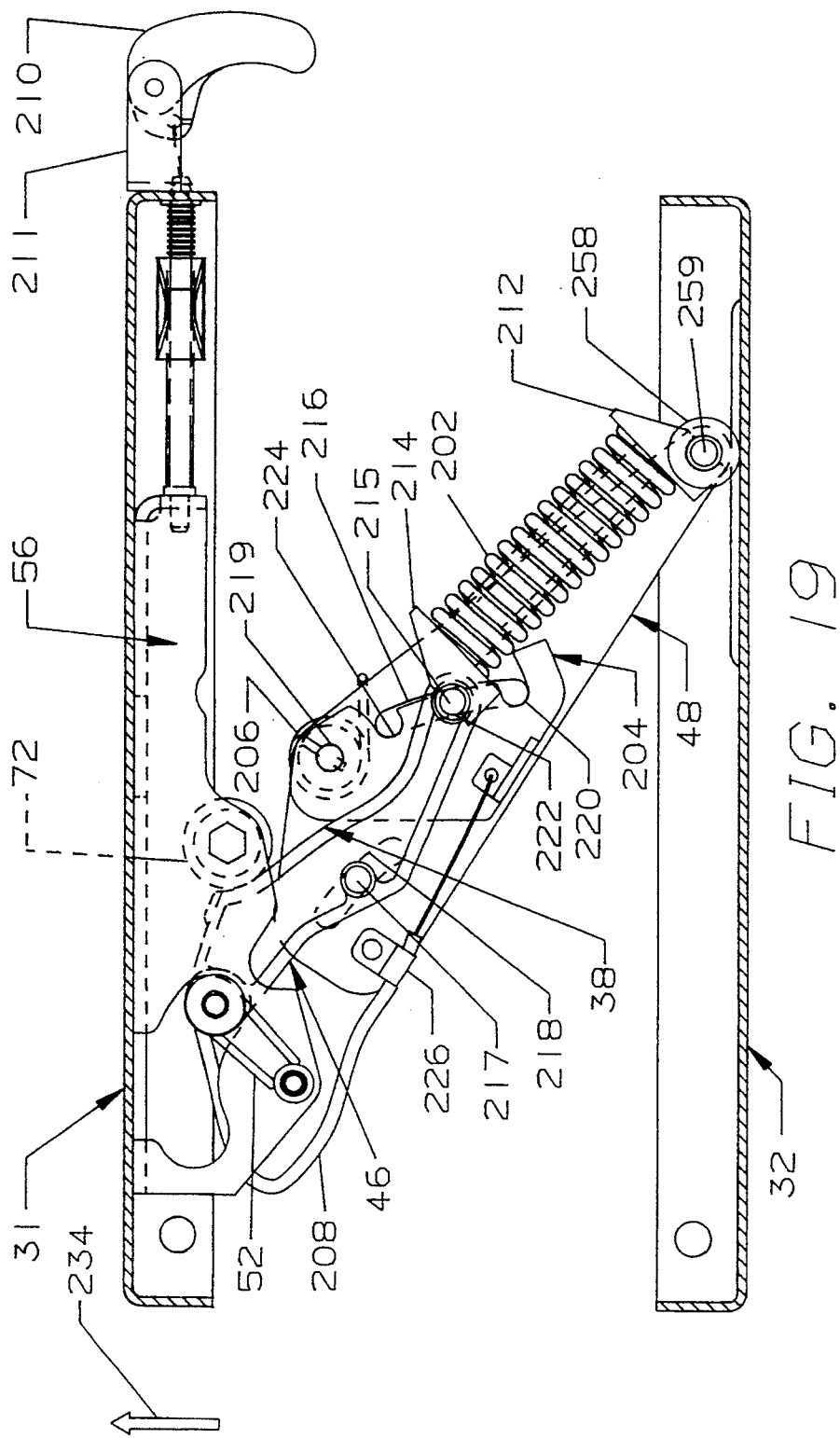
Figure 20:
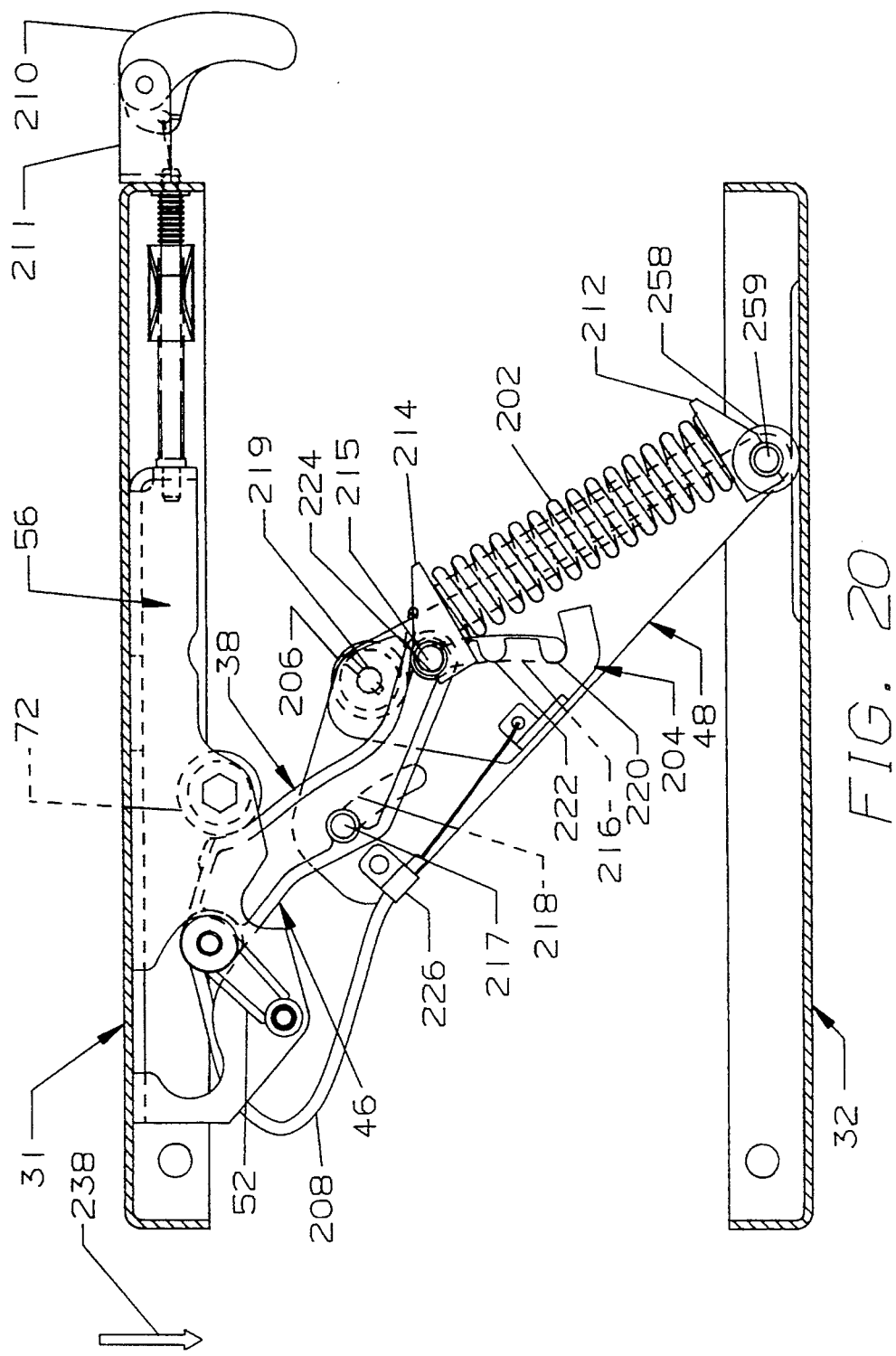

Next, assuming that the operator has released the handle 210, the latch mechanism 204 will pivot about pins 219 under the biasing force of spring 206 into the position illustrated in FIG. 19 in which the pins 215 engage the second notch 222 in each of the walls 205 of latch mechanism 204, thus locking the arms 46 and 48 from relative movement. If, on the other hand, the operator has maintained the handle 210 in its extended position or retracts the handle again, compression spring 202 forces the arms 48 to pivot with respect to arm 46 to raise the seat support plate assembly 31 to the position illustrated in FIG. 20 in which the pins 215 engage the third notches 224 in the walls 205 of latch mechanism 204.

The seat and seat support plate assembly 31 can be lowered back to the lowermost position of FIG. 17 simply by retracting the handle 210 to disengage the latch mechanism 204 from arm 46, and by applying a downward force to the seat support plate assembly 31 which overcomes the force of spring 202 and which pushes the seat support plate assembly 31 downwardly in the direction of arrow 238 (FIG. 20) back to the position illustrated in FIG. 18. Any upward or downward movement of the support plate assembly 31 beyond the extreme locked positions of notches 220 and 224 is prevented by the arc length of slots 216 and 218.

Many changes and modifications could be made to the spring assisted height adjust mechanism 200, as well as to the remaining devices described above, without departing from the spirit and scope of the invention. Such changes and modifications will become more readily apparent from the appended claims.

We claim:

1. A seat suspension system for adjustably supporting a first support member on a second support member thereof, said system comprising:
   a. a mounting mechanism swingably connected to one of said first and second support members;
   b. a support arm assembly including a first end portion pivotally connected to said mounting mechanism and supported on said one support member by said mounting mechanism, said support arm assembly further including a second end portion operatively connected to the other of said first and second support members, said support arm assembly including a first support arm having a cam provided thereon; and
   c. a cam follower which engages said cam, said cam and said cam follower interacting with said mounting mechanism to suspend said first support member with respect to said second support member when a load is imposed on said first support member.

2. A system according to claim 1, wherein said mounting mechanism comprises a link having a first end swingably connected to said one support member and a second end pivotally connected to said first support arm.

3. A system according to claim 1, wherein said support arm assembly further comprises a second support arm having a first end pivotally connected to said first support arm and a second end engaging said other support member.

4. A system according to claim 3, further comprising a height adjust mechanism which adjusts the unloaded height of said first support member relative to said second support member.

5. A system according to claim 4, wherein said height adjust mechanism comprises a ratchet mechanism including
   a detent provided on one of said first and second support arms, and
   a detent receiver provided on the other of said first and second support arms.

6. A system according to claim 5, wherein
   said detent receiver includes a plurality of notches formed in said other support arm; and
   said detent is pivotally mounted on said one support arm and includes 1) a locking pawl which is capable of engaging said notches in said detent receiver, and 2) and a resetting device which selectively engages said detent receiver to move said detent to a position in which said locking pawl is incapable of engaging said notches.

7. A system according to claim 6, further comprising a torsion spring which is mounted on said one support arm and which is pivotable upon operation of said resetting device from a first position biasing said locking pawl towards said detent receiver to a second position biasing said resetting device towards said detent receiver.

8. A system according to claim 1, wherein said first support member comprises a seat support plate assembly and said second support member comprises a base plate assembly, and wherein said mounting mechanism is connected to said seat support plate assembly.

9. A seat suspension system for adjustably supporting a first support member on a second support member thereof, said system comprising:
   a. a mounting mechanism swingably connected to one of said first and second support members;
   b. a support arm assembly having a first end portion pivotally connected to said mounting mechanism and a second end portion operatively connected to the other of said first and second support members, said support arm assembly including a first support arm having a cam provided thereon; and
   c. a cam follower which engages said cam, said cam and said cam follower interacting with said mounting mechanism to suspend said first support member with respect to said second support member when a load is imposed on said first support member, wherein said cam includes a first end portion presenting a first, decreasing spring rate, an intermediate portion presenting a second, generally linear spring rate, and a second end portion presenting a third, increasing spring rate.

10. A system according to claim 9, wherein said first and second end portions of said cam are curved and said intermediate portion is less curved.

11. A seat suspension system for adjustably supporting a first support member on a second support member thereof, said system comprising:
   a. a mounting mechanism swingably connected to one of said first and second support members;
   b. a support arm assembly having a first end portion pivotally connected to said mounting mechanism and a second end portion operatively connected to the other of said first and second support members, said support arm assembly including a first support arm having a cam provided thereon;
   c. a cam follower which engages said cam, said cam and said cam follower interacting with said mounting mechanism to suspend said first support member with respect to said second support member when a load is imposed on said first support member; and
   d. a height adjust mechanism which adjusts the unloaded height of said first support member relative to said second support member, wherein said height adjust mechanism comprises a spring assisted height adjust mechanism including
      (i) a latch mechanism which, when engaged, prevents motion of said first support arm relative to said second support arm; and
      (ii) a compression spring which is operatively connected to each of said first and second support arms and which biases at least one of said first and second support arms towards a position increasing the distance between said first and second support members.

12. A system according to claim 11, wherein said latch mechanism is pivotally connected to one of said first and second support arms and has notches formed therein for engaging the other of said first and second support arms when said latch is pivoted into an engaging position, and wherein said spring assisted height adjust mechanism further comprises a return spring biasing said latch mechanism towards said engaging position.

13. A system according to claim 12, further comprising an actuator for selectively pivoting said latch mechanism relative to said one support arm, thereby to disengage said latch mechanism from said other support arm.

14. A system according to claim 13, wherein said actuator comprises a cable which is connected to said latch mechanism, and further comprising a handle which, when actuated, applies tension to said cable.

15. A seat suspension system for adjustably supporting a first support member on a second support member thereof, said system comprising:
   a. a support arm assembly having a first end portion operatively connected to one of said first and second support members and a second end portion operatively connected to the other of said first and second support members,
   b. a cam which is provided on said support arm assembly and which presents a spring rate which varies depending on the height of said first support member; and
   c. a cam follower which engages said cam, said cam and said cam follower interacting to suspend said first support member with respect to said second support member when a load is imposed on said first support member, wherein said cam has (1) a first end portion presenting a first, decreasing spring rate, (2) an intermediate portion presenting a second, generally linear spring rate, and (3) a second end portion presenting a third, increasing spring rate.

16. A method of adjustably supporting a first support member of a seat assembly on a second support member thereof, said method comprising:
   a. swingably connecting a mounting mechanism to one of said first and second support members;
   b. pivotally connecting a first end of a support arm assembly to said mounting mechanism and supporting said first end of said support arm assembly on said one support member by said mounting mechanism, and operatively connecting a second end portion of said support arm assembly to the other of said first and second support members, said support arm assembly including a first support arm having a cam provided thereon; and c. swinging said mounting mechanism and said support arm about said one support member, under the imposition of forces on said first support member, such that said cam interacts with a cam follower to raise and lower said first support member with respect to said second support member.

17. A method as recited in claim 16, further comprising the step of adjusting the height of said first support member relative to said second support member.

18. A method as recited in claim 17, wherein said step of adjusting comprises actuating a ratchet mechanism.

19. A method as recited in claim 17, wherein said step of adjusting comprises actuating a spring assisted height adjust mechanism.

20. A spring assisted height adjust mechanism for permitting relative movement of first and second support members of a seat assembly, comprising:
 a. first and second support arms, each of which has a first end operatively connected to and movable with respect to one of said first and second support members and which has a second end extending generally towards the other of said first and second support arms;
 b. a latch mechanism connected to said second support arm and movable on said second support arm from a first position engaging said first support arm and preventing relative movement of said first and second support arms to a second position permitting relative movement of said first and second support arms; and
 c. a compression spring which is operatively connected to at least one of said first and second support arms and which biases said at least one support arm towards a position increasing the space between said first and second support members.

21. A mechanism according to claim 20, wherein a pin is formed on said first support arm, and wherein said latch mechanism selectively engages said pin, is pivotally connected to said second support arm, and has notches formed thereon for engaging said pin when said latch mechanism is pivoted to said first position.

22. A mechanism according to claim 21, further comprising a return spring for biasing said latch mechanism towards said first position.

23. A mechanism according to claim 21, further comprising an actuator for selectively pivoting said latch mechanism relative to said one support arm, thereby to disengage said latch mechanism from said other support arm.

24. A mechanism according to claim 23, wherein said actuator comprises a cable which is connected to said latch mechanism, and further comprising a handle which, when actuated, applies tension to said cable.

25. A spring assisted height adjust mechanism for permitting relative movement of first and second support members of a seat assembly, comprising:
 a. first and second support arms, each of which has a first end operatively connected to one of said first and second support members and which has a second end extending generally towards the other of said first and second support arms;
 b. a latch mechanism movable with respect to one of said first and second support arms from a first position preventing relative movement of said first and second support arms to a second position permitting relative movement of said first and second support arms, wherein a pin is formed on the other of said first and second support arms and said latch mechanism selectively engages said pin, is pivotally connected to said one support arm, and has notches formed thereon for engaging said pin when said latch mechanism is pivoted to said first position;
 c. a compression spring which is operatively connected to at least one of said first and second support arms and which biases said one support arm towards a position increasing the space between said first and second support members; and
 d. a second pin formed on said other support arm, wherein said one support arm has arcuate slots formed therein which receive said first and second pins, respectively.

26. A seat assembly, comprising:
 a. a base plate assembly;
 b. a seat support plate assembly;
 c. a seat mounted on said seat support plate assembly;
 d. a link swingably mounted on said seat support plate assembly;
 e. a support arm assembly having a first end portion pivotally connected to said link and a second end portion operatively connected to said base plate assembly, said support arm assembly having a cam provided thereon, said cam including a first end portion presenting a first, decreasing spring rate, an intermediate portion presenting a second, generally linear spring rate, and a second end portion presenting a third, increasing spring rate, and wherein said first and second end portions of said cam are curved and said intermediate portion is less curved; and
 f. a cam follower comprising a roller which is mounted on said seat support plate assembly and which engages said cam, said cam, said cam follower, and said link interacting to suspend said seat support plate assembly with respect to said base plate assembly when a load is imposed on said seat support plate assembly.

27. A seat assembly according to claim 26, wherein said support arm assembly comprises first and second support arms, said first support arm having a first end pivotally connected to said link and having a second end, and a second support arm having a first end pivotally connected to said first support arm and a second end engaging said base plate assembly.

28. A seat assembly according to claim 27, further comprising a ratchet height adjust mechanism for adjusting the unloaded position of said seat support plate assembly relative to said base plate assembly.

29. A seat assembly according to claim 27, further comprising a spring assisted height adjust mechanism for adjusting the unloaded position said seat support plate assembly relative to said base plate assembly by moving said first and second support arms relative to one another.

30. A seat assembly, comprising:
 a. a base plate assembly;
 b. a seat support plate assembly;
 c. a seat mounted on said seat support plate assembly;
 d. a link having a first end pivotably connected to one of said seat support plate assembly and said base plate assembly and a second end positioned between said first end and a support surface of said one plate assembly and swingable through a designated arc;

e. a support arm assembly having a first end portion pivotally connected to said second end of said link and a second end portion operatively connected to the other of said seat support plate assembly said base plate assembly, said support arm assembly having a cam provided thereon; and f. a cam follower comprising a roller which is mounted on said one plate assembly and which engages said cam, said cam, said cam follower, and said link interacting to suspend said seat support plate assembly with respect to said base plate assembly when a load is imposed on said seat support plate assembly.

* * * * *